United States Patent
Torres-Castellano

(10) Patent No.: US 12,479,147 B2
(45) Date of Patent: Nov. 25, 2025

(54) METHOD FOR TWO-STAGE CLOSURE OF A ROLLER EXTRUSION FACILITY FOR PRECISE ADJUSTMENT OF THE AIR GAP FOR GENERATING A PROFILED ELEMENT

(71) Applicant: COMPAGNIE GENERALE DES ETABLISSEMENTS MICHELIN, Clermont-Ferrand (FR)

(72) Inventor: Miguel Torres-Castellano, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 312 days.

(21) Appl. No.: 18/269,338

(22) PCT Filed: Oct. 22, 2021

(86) PCT No.: PCT/FR2021/051854
§ 371 (c)(1),
(2) Date: Jun. 23, 2023

(87) PCT Pub. No.: WO2022/136745
PCT Pub. Date: Jun. 30, 2022

(65) Prior Publication Data
US 2024/0083085 A1    Mar. 14, 2024

(30) Foreign Application Priority Data
Dec. 23, 2020 (FR) .................................. 2014010

(51) Int. Cl.
*B29C 48/35* (2019.01)
*B29C 48/07* (2019.01)
(Continued)

(52) U.S. Cl.
CPC .............. *B29C 48/35* (2019.02); *B29C 48/07* (2019.02); *B29C 48/12* (2019.02); *B29C 48/21* (2019.02);
(Continued)

(58) Field of Classification Search
CPC ......... B29C 48/35; B29C 48/07; B29C 48/12; B29C 48/21; B29C 48/522;
(Continued)

(56) References Cited

U.S. PATENT DOCUMENTS 2,041,990 A * 5/1936 Breth .................... B29D 30/30
156/405.1
3,253,073 A * 5/1966 Skobel ................. B29C 48/303
156/244.11
(Continued)

FOREIGN PATENT DOCUMENTS

WO      2020/058625 A1    3/2020

OTHER PUBLICATIONS

International Search Report dated Feb. 3, 2022, in corresponding PCT/FR2021/051854 (4 pages).

*Primary Examiner* — Jeffrey M Wollschlager
(74) *Attorney, Agent, or Firm* — VENABLE LLP

(57) ABSTRACT

A method for closing a facility (1) for extrusion of a profiled element (2) comprising a roller (3) supported by a bearing (4), a tool module (10) intended to interact with the roller (3) so as to form an air gap (12) for shaping the profiled element (2), and at least a first head module (13) having a first extruder (14) comprises an engagement step (s1), during which the tool module (10) is urged against the first bearing (4) by a preload force (F_Z), in an engagement direction (Z), then a clamping step (s2) during which the tool module (10) is clamped between the first head module (13) and a second head module (23), on either side of the tool module (10), and
(Continued)

by subjecting them to a clamping force ($F\_X$), in a coupling direction (X) which is transverse to the engagement direction (Z).

15 Claims, 12 Drawing Sheets

(51) Int. Cl.
    *B29C 48/12*     (2019.01)
    *B29C 48/21*     (2019.01)
    *B29C 48/25*     (2019.01)
    *B29C 48/265*     (2019.01)
    *B29C 48/30*     (2019.01)
    *B29C 48/49*     (2019.01)
    *B29D 30/00*     (2006.01)
    *B29D 30/06*     (2006.01)
    *B29D 30/52*     (2006.01)
    *B29D 30/72*     (2006.01)

(52) U.S. Cl.
    CPC ...... *B29C 48/2522* (2019.02); *B29C 48/2562* (2019.02); *B29C 48/265* (2019.02); *B29C 48/2665* (2019.02); *B29C 48/49* (2019.02); *B29D 30/005* (2013.01); *B29D 30/0061* (2013.01); *B29D 30/0681* (2013.01); *B29D 30/52* (2013.01); *B29D 30/72* (2013.01); *B29C 48/302* (2019.02)

(58) Field of Classification Search
    CPC ............. B29C 48/2562; B29C 48/265; B29C 48/2665; B29C 48/40; B29C 48/302; B29D 30/005; B29D 30/0061; B29D 30/0681; B29D 30/52; B29D 307/72
    See application file for complete search history.

(56) References Cited

U.S. PATENT DOCUMENTS

| | | | | |
|---|---|---|---|---|
| 3,849,051 A * | 11/1974 | Solbeck | ............... | B29C 48/21 156/244.11 |
| 3,871,810 A * | 3/1975 | Geyer | ............... | B29C 48/92 425/374 |
| 3,907,478 A * | 9/1975 | Vernon | ............... | B29C 43/222 425/327 |
| 3,947,201 A * | 3/1976 | Ellwood | ............... | B29C 48/35 425/327 |
| 4,147,577 A * | 4/1979 | Kobayashi | ............... | B29B 7/64 425/DIG. 235 |
| 4,354,814 A * | 10/1982 | Grimminger | ....... | B29C 48/2562 425/188 |
| 4,372,736 A * | 2/1983 | Gooch | ............... | B29C 48/08 425/149 |
| 4,569,711 A * | 2/1986 | Sumner | ............... | B29D 30/72 425/436 R |
| 4,642,039 A * | 2/1987 | Anders | ............... | B29C 48/2562 425/149 |
| 4,927,482 A * | 5/1990 | Capelle | ............... | B29C 48/35 156/244.11 |
| 4,958,558 A * | 9/1990 | Harreither | ............... | B30B 3/04 100/168 |
| 5,030,079 A * | 7/1991 | Benzing, II | ............... | B29C 48/06 425/374 |
| 6,695,606 B1 | 2/2004 | Burg et al. | | |
| 6,972,103 B1 * | 12/2005 | Nawrath | ............... | B29C 48/35 264/214 |
| 7,354,187 B2 * | 4/2008 | Yada | ............... | B29B 7/489 366/85 |
| 8,631,925 B1 * | 1/2014 | Hanson | ............... | B29C 48/0018 198/586 |
| 2001/0050135 A1 * | 12/2001 | Takaoka | ............... | B65H 18/26 156/187 |
| 2004/0168585 A1 * | 9/2004 | Aho | ............... | B30B 3/04 100/327 |
| 2005/0173828 A1 * | 8/2005 | Morita | ............... | B29C 48/08 264/212 |
| 2006/0260484 A1 * | 11/2006 | Mizunuma | ............... | B29C 48/906 101/216 |
| 2010/0300171 A1 * | 12/2010 | Hanson | ............... | B29C 43/46 72/256 |
| 2013/0228082 A1 * | 9/2013 | Honjou | ............... | H01M 4/0435 492/2 |
| 2018/0126622 A1 * | 5/2018 | Herbing | ............... | B29C 48/3001 |
| 2019/0126519 A1 * | 5/2019 | Hodsdon | ............... | B29C 48/35 |
| 2019/0263021 A1 * | 8/2019 | Fabre | ............... | B29C 53/043 |
| 2021/0129459 A1 * | 5/2021 | Wilms | ............... | B29C 70/20 |
| 2022/0032525 A1 | 2/2022 | Ougier et al. | | |
| 2023/0036508 A1 | 2/2023 | Mosnier et al. | | |

\* cited by examiner

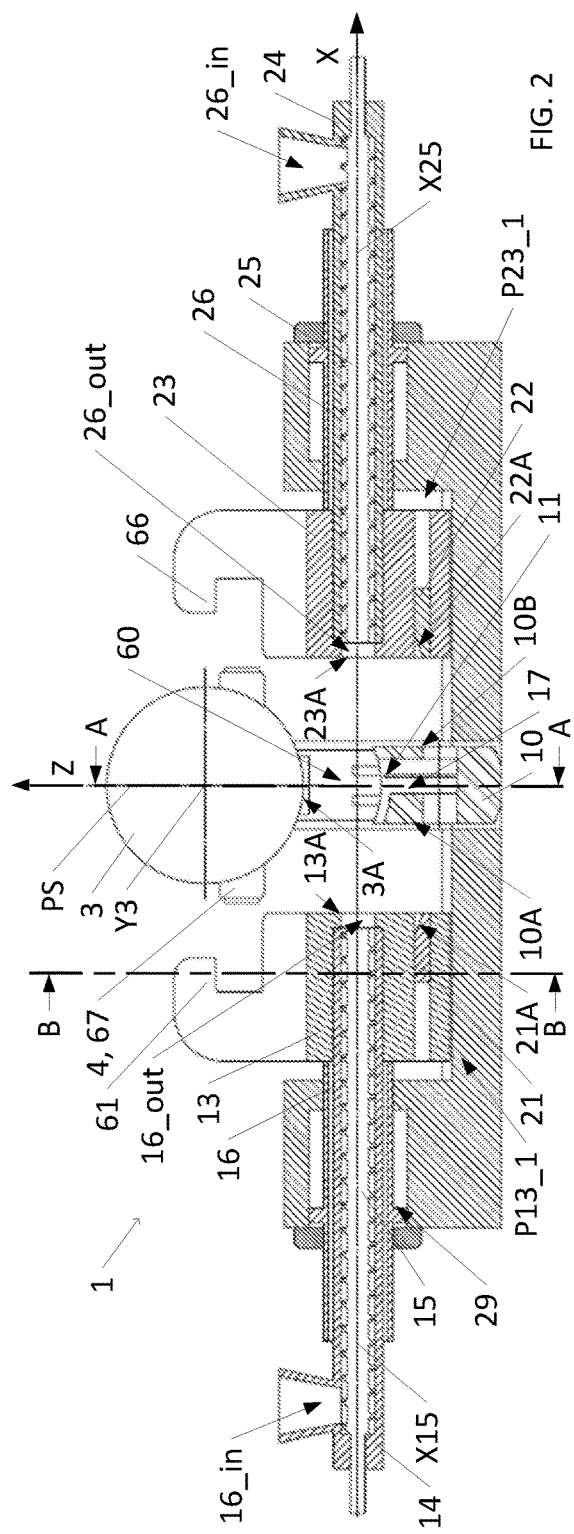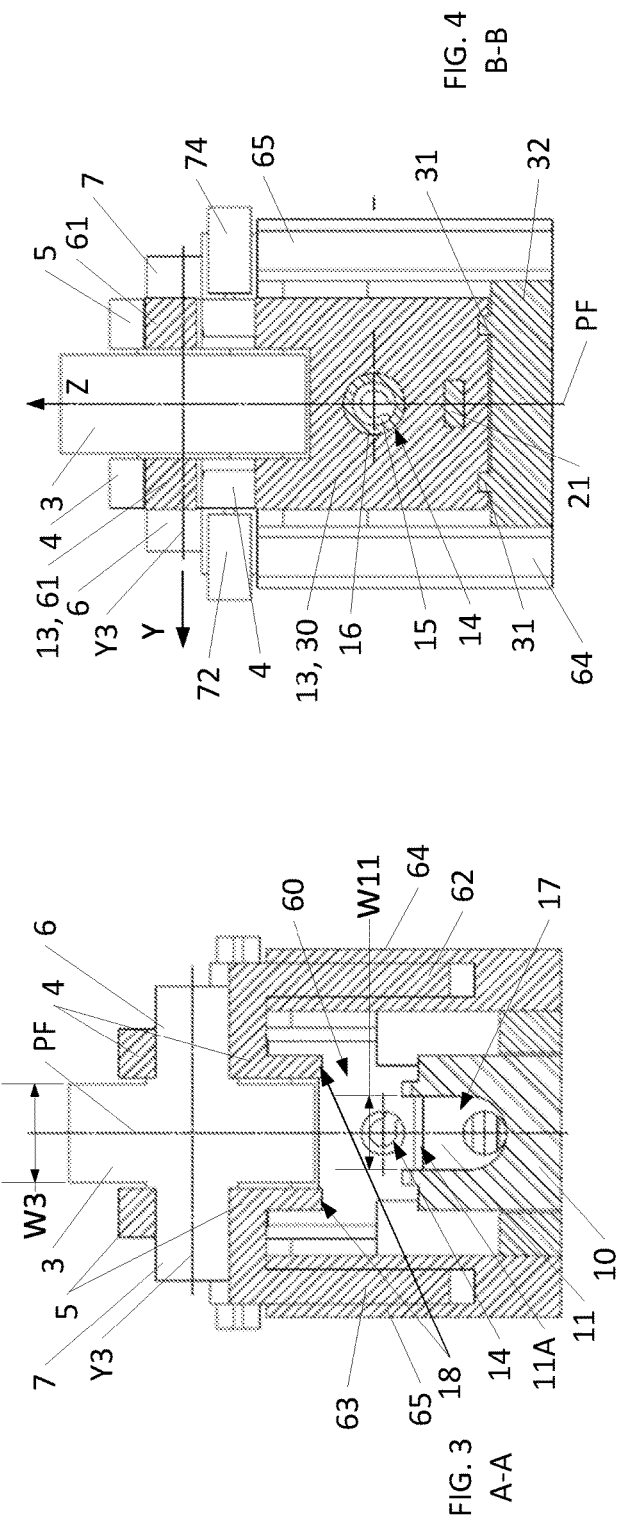

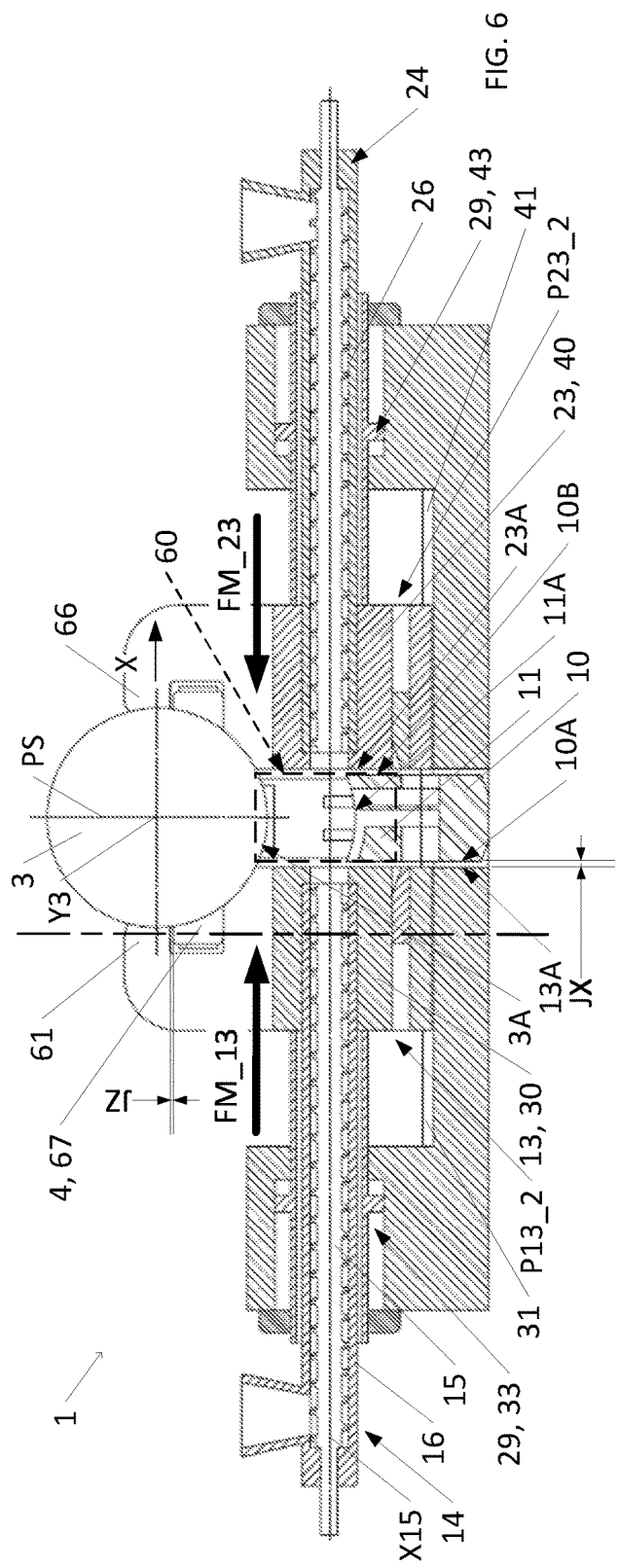
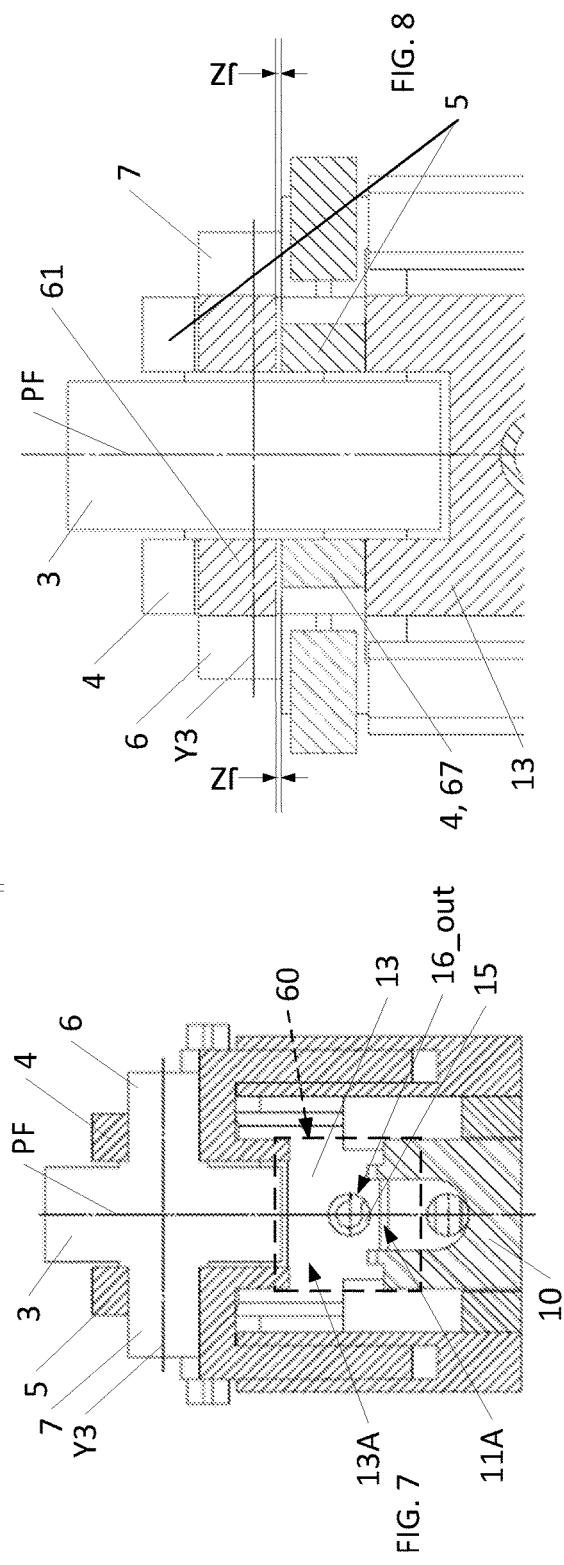

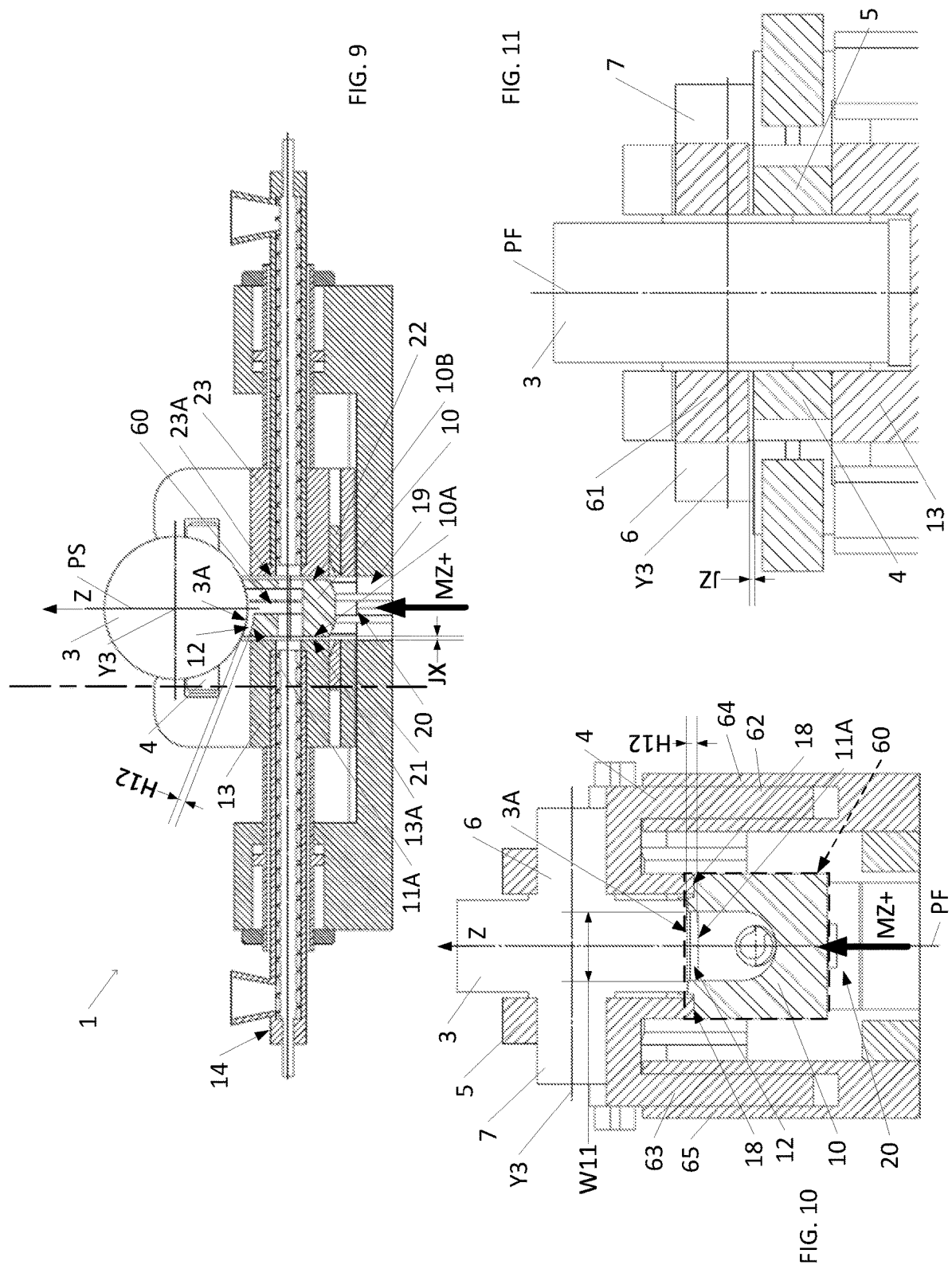

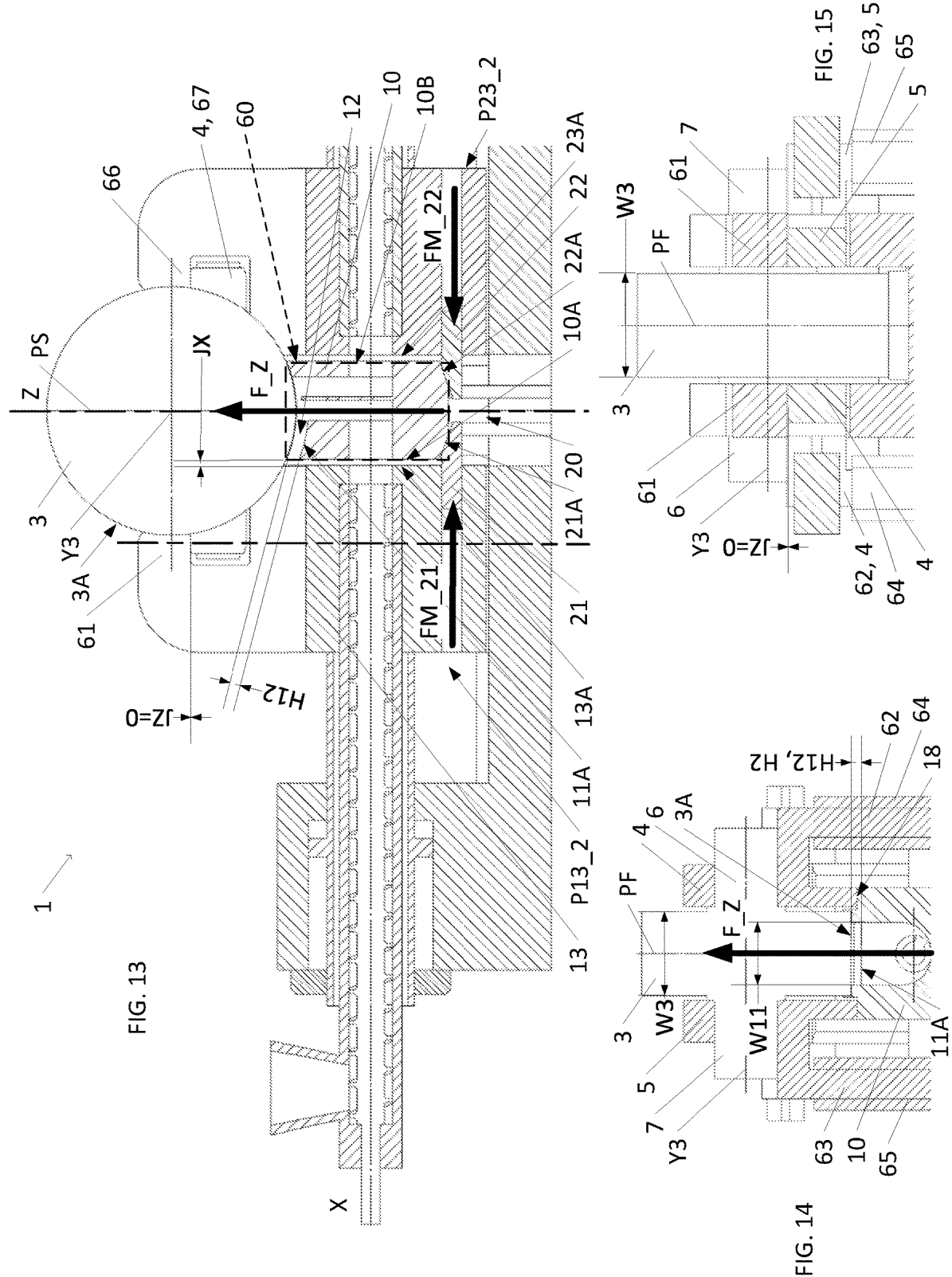

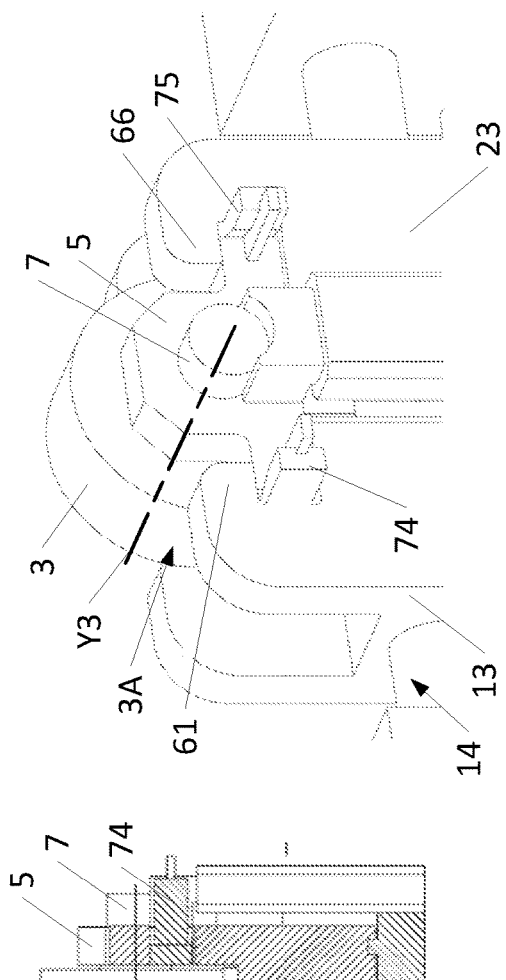
FIG. 17
FIG. 18
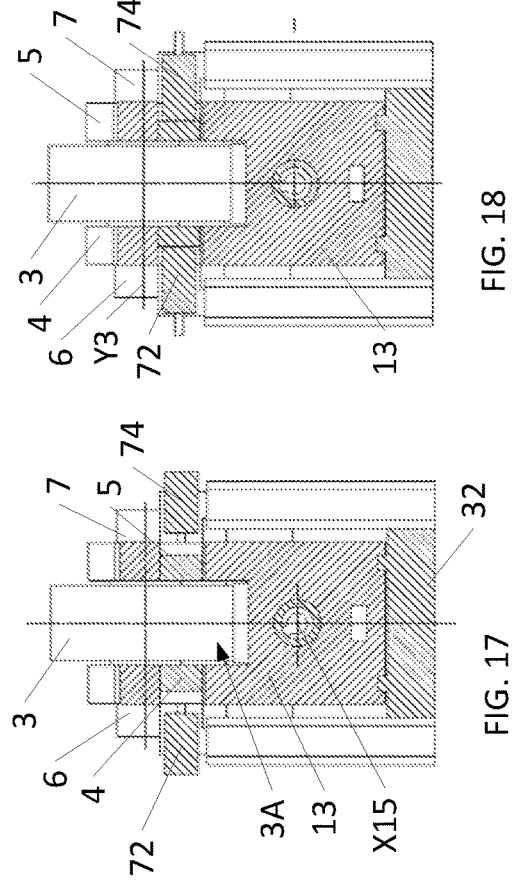
FIG. 19
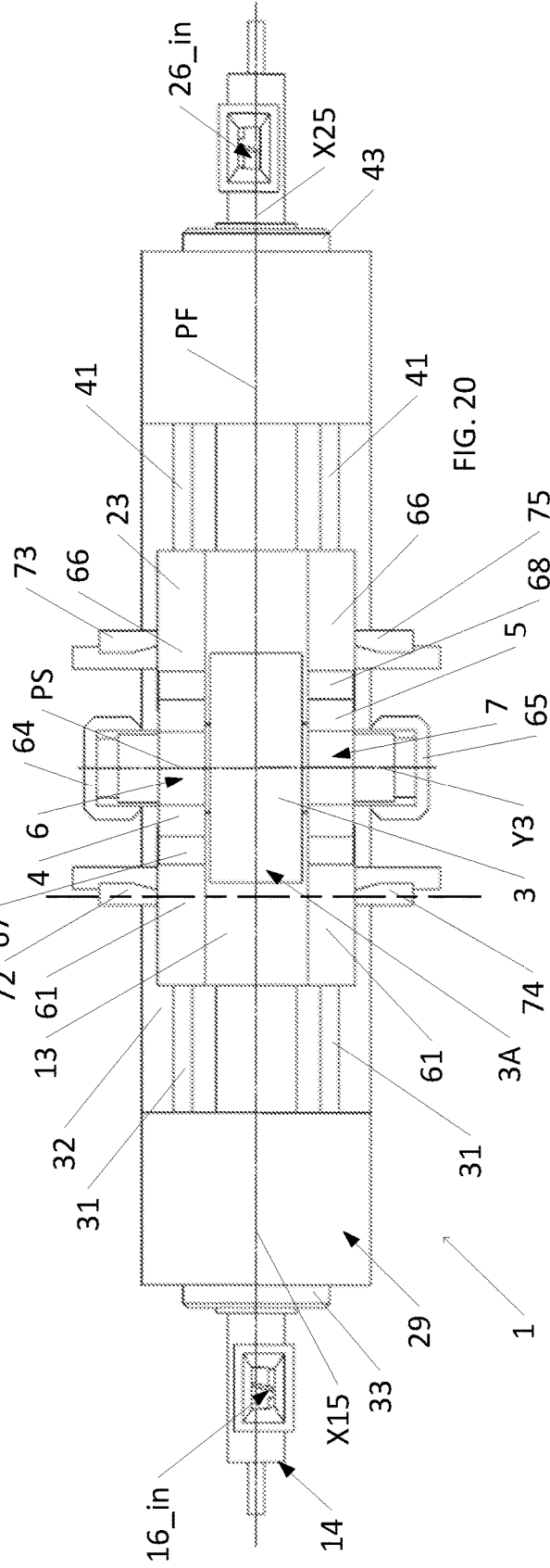
FIG. 20

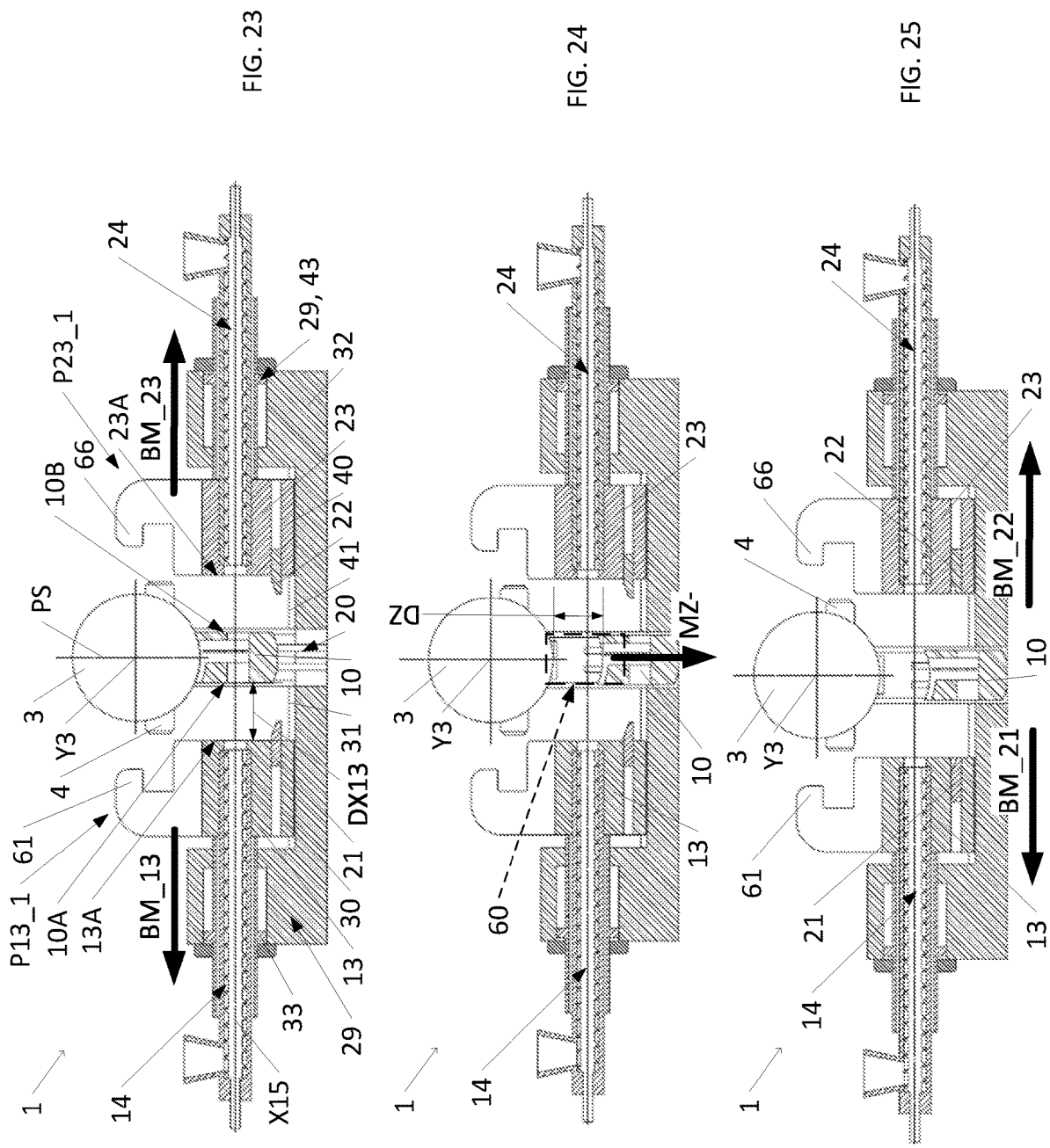

METHOD FOR TWO-STAGE CLOSURE OF A ROLLER EXTRUSION FACILITY FOR PRECISE ADJUSTMENT OF THE AIR GAP FOR GENERATING A PROFILED ELEMENT

BACKGROUND

The present invention relates to the general field of extrusion machines intended for the manufacture of a profiled element from one or more materials, such as rubber-based compounds, which are extruded and then shaped through a die.

The invention relates more particularly to a facility and a method for extrusion making it possible to generate a profiled element, the section of which is defined by an air gap which is delimited on the one hand by the outer surface of a roller mounted rotatably on a bearing and on the other hand by a die with a shape substantially matching that of the roller.

The invention is in particular applicable to the manufacture of profiled elements intended to form constituent elements of pneumatic tyres, such as treads or sidewalls.

Many architectures of extrusion facilities already exist, in particular architectures within which a tool module, fed by one or more extruders and carrying a die, is brought close to the outer surface of a rotatably mounted roller, in such a way as to define, between said die and said outer surface of the roller, an air gap having a height corresponding to the thickness of the profiled element which it is desired to produce. As the profiled element is generated in the gap, said profiled element is advantageously conveyed by the roller, on which said profiled element gradually cools and stabilizes dimensionally.

However, due in particular to the high pressures necessary to convey and shape the constituent materials of the profiled element through the die and the air gap, it is sometimes difficult to guarantee perfect sealing of the extrusion facility, as well as the precision and regularity over time of the height of the air gap, and therefore of the thickness of the resulting profiled element, in particular when it is desired to produce a thin profiled element through a particularly small air gap.

Moreover, known extrusion facilities are often bulky, and sometimes difficult to reconfigure and clean upon production changes, which require replacement of the tooling to adapt same to the layout and dimensions of the new profiled element to be produced.

The subject matter associated with the invention therefore aims to remedy the abovementioned drawbacks and to propose a new method and a new facility for extrusion which allow precise and robust adjustment of the extrusion air gap, with little sensitivity to deformation under pressure.

The subject matter associated with the invention also aims to provide an extrusion facility which offers easy access to its constituent parts for reconfiguration or replacement operations required by production changes.

SUMMARY

The subject matter associated with the invention is achieved by virtue of a method for implementing an extrusion facility intended for the production of a profiled element, said extrusion facility comprising a roller which is supported rotatably by at least a first bearing, a tool module which comprises a die intended to interact with the roller so as to form an air gap allowing the profiled element to be shaped, and at least a first head module having a first extruder which is intended to supply the tool module with a first constituent material of the profiled element, said method being characterized in that it comprises:

an engagement step (s1), during which the tool module is moved relative to the first head module and to the first bearing in a first direction referred to as the "engagement direction", in such a way as to bring said tool module into abutment against the first bearing and to subject said tool module to a preload force which is oriented in the engagement direction and counter to the first bearing, in such a way as to place said tool module relative to the roller in a configuration referred to as the "engagement configuration" which defines the desired air gap for producing the profiled element, then a clamping step (s2), during which, while said tool module is in its engagement configuration, prestressed against the first bearing by the preload force, said tool module is clamped between the first head module having the first extruder and a second head module distinct from the first head module, by moving said first head module and the second head module towards one another, on either side of the tool module, in a second direction referred to as the "coupling direction" which is transverse to the engagement direction, preferably perpendicular to said engagement direction, in such a way as to place the first extruder in communication with the tool module, and by subjecting said first and second head modules to a clamping force which is oriented in said coupling direction, in such a way as to hold the tool module by compression between the first and second head modules.

The subject matter associated with the invention is also achieved by virtue of a corresponding facility, said facility comprising:

a roller which is supported rotatably by at least a first bearing, a tool module which comprises a die intended to interact with the roller so as to form an air gap allowing the profiled element to be shaped, a first head module which carries at least a first extruder intended to supply a first constituent material of the profiled element, said facility being characterized in that it comprises:

an engagement device, which makes it possible to move the tool module relative to the first bearing and relative to the first head module in a first direction, preferably vertical, referred to as the "engagement direction", in such a way as to be able alternatively to either bring the tool module towards the roller until said tool module is in abutment against a docking stop which is rigidly secured to the first bearing, and subject said tool module to a preload force which is oriented in the engagement direction and counter to said docking stop and the first bearing, in such a way as to place said tool module relative to the roller in a configuration referred to as the "engagement configuration" which defines the desired air gap for producing the profiled element, preferably an air gap of which the height considered radially relative to the roller is between 0.1 mm and 150 mm, or conversely move said tool module away from the roller and from the docking stop in order to place said tool module in a disengagement configuration, distinct from the engagement configuration, a second head module, a coupling device which gives the first head module and/or the second head module its own mobility relative to the first bearing and relative to the tool module in a second direction referred to as the "coupling direction" which is oriented transversely to the engagement direction, preferably perpendicularly to said engagement direction, so that said coupling device makes it possible alternatively either to bring the first head module and the second head module towards one another in said coupling direction, on either side of the tool module, when said tool module is in the engagement configuration, in such a way as to place the first extruder in communication with the tool module and to clamp said tool module between the first head module and the second head module, in a configuration referred to as the "closed configuration", or conversely to move the first head module away from the second head module in the coupling direction, in such a way as to disengage the first extruder from the tool module and to release the tool module to allow a movement of said tool module relative to the bearing and relative to the first and second head modules in the engagement direction.

DETAILED DESCRIPTION

Advantageously, the closure sequence proposed by the invention, which includes abutment and preloading of the tool module against the first bearing, makes it possible to eliminate any assembly clearances and to position the die relative to the roller very precisely, and reproducibly, and thus to precisely define the air gap.

Furthermore, the preload force which prestresses the die against the roller in the engagement direction makes it possible to partially, or even totally, compensate for the effects of the pressure of the material which appear when the facility is in operation and the extruder or extruders deliver the material through the tool module and the air gap. To be specific, the pressure prevailing in the air gap when the material is extruded through said air gap tends to push back the die relative to the roller, that is to say tends to force the tool module back in the engagement direction relative to the roller, together with a degree of pressing on said tool module by compression in said engagement direction, and consequently tends to increase the height of the air gap which defines the thickness of the profiled element. In this case, by virtue of the invention which provides a preload which tends to force the tool module towards the roller, and more particularly the die towards the surface of said roller, and which therefore produces an effect opposing the effects of the pressure of the extruded material, the height of the air gap is maintained precisely and stably, substantially at the desired nominal value, throughout the entire extrusion process, which prevents any deviation in the thickness of the profiled element produced.

Advantageously, the holding of the tool module in the appropriate, preloaded position which corresponds to the engagement configuration is reinforced by the lateral clamping exerted by the first head module and the second head module on the tool module. To be specific, by thus taking the tool module in a vice grip, said first and second head modules help to firmly prevent, by friction, said tool module, and therefore the die, from moving back relative to the roller, in the engagement direction, into the disengagement configuration.

The tool module is thus held in the closed configuration particularly robustly and stably, especially as the tool module may be clamped between the first and second head modules in a region of said tool module which is particularly close to the air gap, and close to the first bearing.

To be specific, from a mechanical point of view, the chain of transmission of forces which ensures that the die is held in position relative to the first bearing and to the roller can be depicted schematically by a virtual line which is closed on itself, passing successively through the first bearing, then through the first head module (respectively through the second head module), and lastly through the tool module which carries the die. The bearing points at which these various elements respectively come into contact with one another form the points through which said chain of transmission of forces passes.

However, because the tool module is clamped by the first and second head modules close to the air gap, said chain of transmission of forces is particularly short, and therefore only applies to relatively small thicknesses of the solid material or materials, typically steel alloys, constituting the first bearing, the head modules, and the tool module.

As a result, once placed in the closed configuration, the facility has little sensitivity to deformation linked to the intrinsic elasticity, even minimal, of said solid material or materials constituting the first bearing, the head modules, and the tool module.

To be specific, for a solid material with a given modulus of elasticity, in particular a given Young's modulus in compression, the shorter the initial length of the portion of said solid material through which the chain of transmission of forces in question passes, the higher the apparent stiffness of said portion of said solid material (the behaviour in elastic deformation of the block of solid material passed through is similar to behaviour of spring type), and therefore the greater the overall stiffness of the corresponding assembly connection.

Thus, the closer the area of application of the clamping force exerted on the tool module is to the air gap, the less the die is pushed back under the effect of the pressure of the extruded material.

Moreover, because the facility according to the invention uses an engagement direction and a coupling direction which are intersecting, said facility advantageously makes it possible to dissociate the movements of the tool module from the movements specific to the head modules and extruders carried by said head modules, which makes it possible in particular to reduce the overall bulk of the facility, by efficiently distributing the head modules and their extruders with respect to the tool module and with respect to the roller, while facilitating operator access to the extruders for cleaning operations and/or tool replacement operations.

Note in this regard that the facility according to the invention advantageously makes it possible to replace the tool module in a single block, by removing a first complete tool module which was initially in place, and replacing it with another complete tool module, depending on the production change required.

BRIEF DESCRIPTION OF THE FIGURES

Further subject matter, features and advantages of the invention will become apparent in greater detail upon reading the following description, with the aid of the appended drawings, which are provided purely by way of non-limiting illustration, in which:

FIG. 2 shows the facility of FIG. 1, in the open configuration, viewed in cross section through a plane referred to as the "frontal plane" which contains the engagement direction and the coupling direction, and which is in this case normal to the axis of rotation of the roller.

FIG. 3 shows the facility of FIGS. 1 and 2 viewed in cross section through a plane referred to as the "sagittal plane", which is in this case normal to the coupling direction and which contains the engagement direction and the axis of rotation of the roller; said sagittal plane divides the facility into two parts that are substantially, or even exactly symmetrical to one another.

FIG. 4 shows the facility of FIGS. 1 and 2 viewed in cross section through a secondary sectional plane which is parallel to the sagittal plane and which in this case passes through the solid portion of the upper branch of a retaining hook which is associated with the first head and arranged so as to engage the first bearing in order to retain said first bearing against the preload force.

FIG. 6 shows, viewed in cross section through the frontal plane, the facility of FIG. 5 in the pre-positioning configuration.

FIG. 7 shows the facility of FIGS. 5 and 6 viewed in cross section through the sagittal plane.

FIG. 8 shows the facility of FIGS. 5 and 6 according to a detail view in cross section through the secondary sectional plane, showing the clearance referred to as the "preload clearance" which initially separates, in the engagement direction, the first bearing from the stops formed by the retaining hooks of the first and second head modules.

FIG. 9 shows, in cross section through the frontal plane, the facility of the preceding figures at the end of an approach phase in which the tool module has been brought, by moving in the engagement direction, into the space between the first and second head modules, in contact with the first bearing, in such a way as to place the die at a distance from the roller which is appropriate for the desired height for the air gap.

FIG. 10 shows the facility of FIG. 9 viewed in cross section through the sagittal plane.

FIG. 11 shows the facility of FIGS. 9 and 10 according to a detail view in the secondary sectional plane, in which it can be seen, on the one hand, that the tool block has come into contact with a docking stop rigidly secured to the first bearing, in such a way as to bear on said first bearing, and on the other hand that the preload clearance separating the base of the first bearing from the retaining hook is still present, in such a way as to form a travel reserve in the engagement direction to allow a slight additional movement of the tool module and of the first bearing as a whole, during a subsequent preloading phase.

FIG. 13 is a partial view of the facility of FIG. 12 in the engagement configuration, viewed in cross section through the frontal plane, which shows the action of preloading actuators having ramps which stress the tool module, and, via said tool module, the first bearing, so as to bring the first bearing into abutment against the retaining hooks and generate the desired preload force in the engagement direction. In this case, said preload actuators act in gripping regions which are located at one end of said tool module, opposite the end which carries the die and which interacts with the roller so as to form the air gap.

FIG. 14 is a detail view of the facility of FIGS. 12 and 13, viewed in cross section through the sagittal plane, which shows the lifting of the first bearing under the effect of the thrust exerted by the tool module moved by the preloading actuators during the preloading phase, and the guidance in translation in the engagement direction, in this case vertical, of said first bearing along two posts provided for this purpose.

FIG. 15 is a partial view of the facility of FIGS. 12 to 14, viewed in cross section through the secondary sectional plane, which shows the elimination of the preload clearance achieved through the action of the preloading actuators which push and hold the tool module, and therefore the first bearing driven by said tool module, against the retaining hooks, in the engagement direction.

FIGS. 17 and 18 show, viewed in cross section through the secondary sectional plane, the facility of the preceding figures in the closed configuration, respectively before and after the engagement of stabilizing wedges which are each inserted between the base of the first bearing and one of the retaining hooks in order to block and urge the first bearing in a direction transverse to the axis of rotation of the roller and parallel to the coupling direction, in such a way as to laterally stabilize said first bearing and said roller and to prevent any bending movement of the posts, and thus in such a way as to prevent any lateral shifting of the roller relative to the die during the operation of generating the profiled element.

FIG. 19 is a partial perspective view of the facility of FIG. 18, with the stabilizing wedges engaged between the first bearing and the retaining hooks carried by the first and second head modules.

FIG. 20 shows the facility of FIGS. 18 and 19 in a top view.

FIG. 23 shows, viewed in cross section through the frontal plan, the facility of the preceding figures in a first reopening phase wherein the first and second head modules are moved away from one another so as to disengage them, with their respective extruders, from the tool module.

FIG. 24 shows, viewed in cross section through the frontal plan, the facility of the preceding figures in a second reopening phase during which the tool module is moved away from the roller, in this case by lowering said tool module, in such a way as to cause said tool module to go into a disengagement configuration.

FIG. 25 shows, viewed in cross section through the frontal plan, the facility of the preceding figures in a third and final reopening phase, during which the preloading actuators are retracted, in this case inside the first and second head modules, so as to return to the open configuration shown in FIG. 1.

Figure 21:
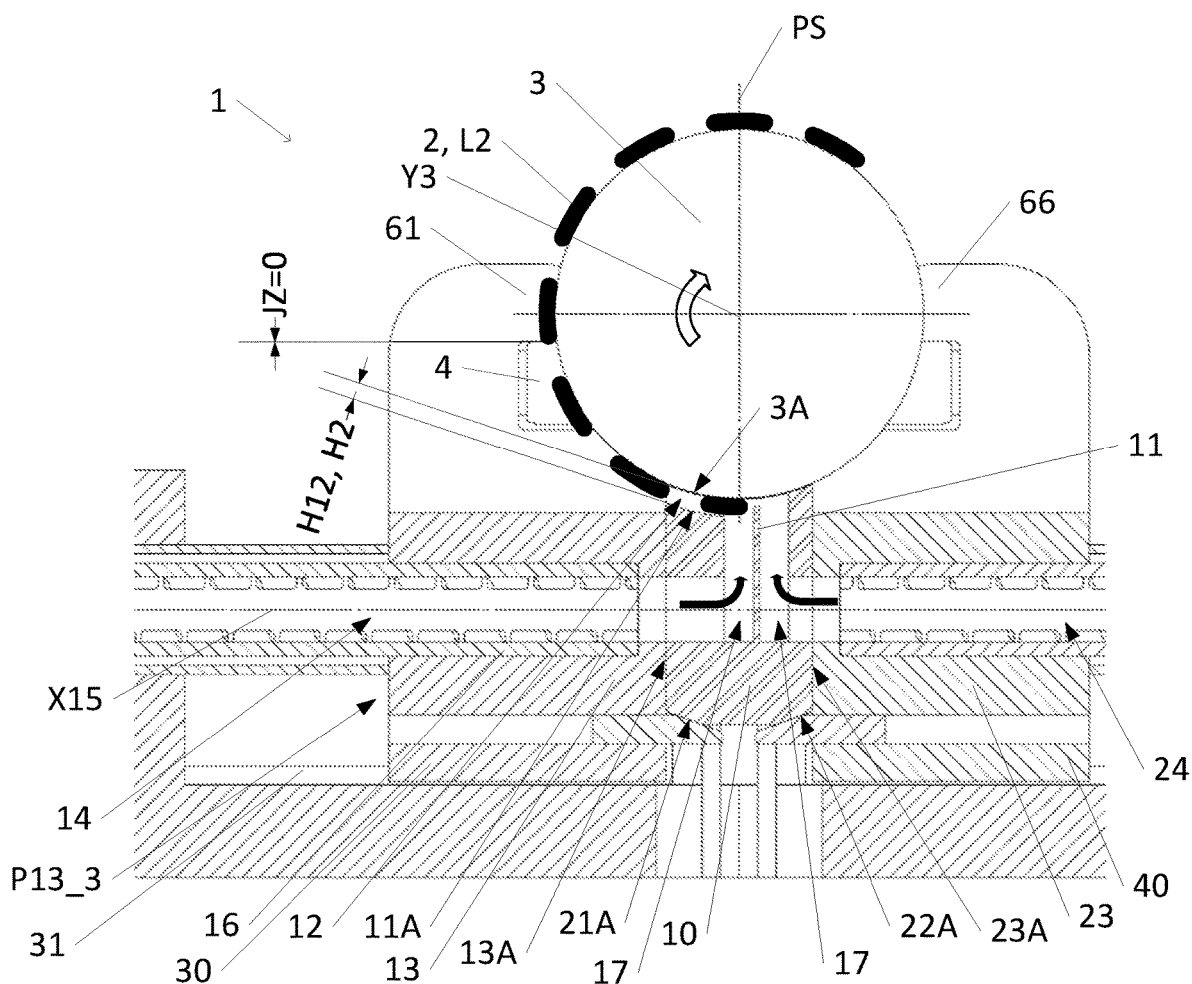
FIGS. 21 and 22 show, viewed partially in cross section through the frontal plane and the sagittal plane, respectively, the facility of the preceding figures in the closed configuration, during the extrusion of a profiled element.
Figure 22:
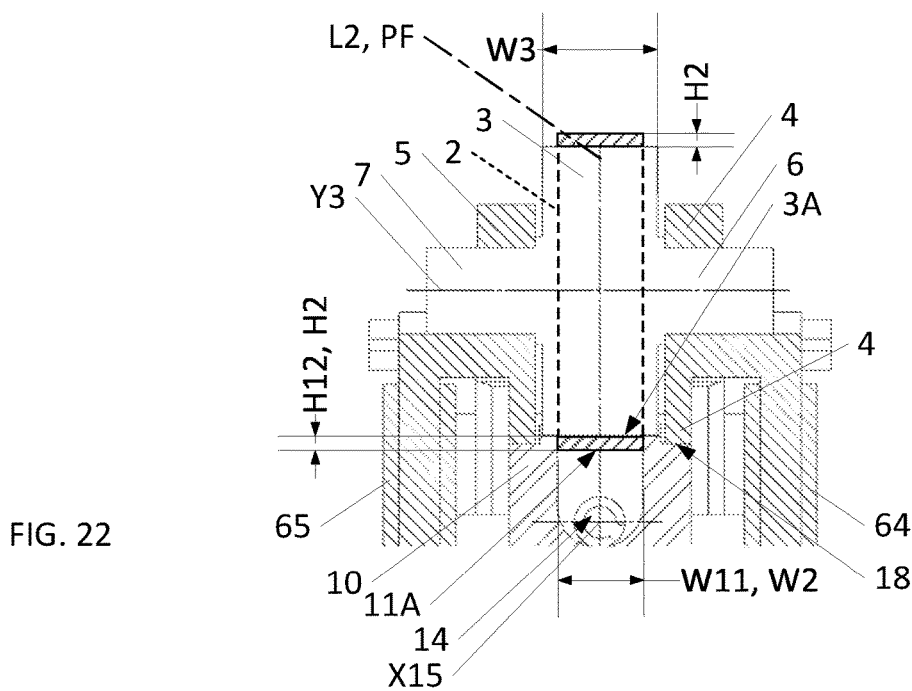

The present invention relates to an extrusion facility 1 intended for the production of a profiled element 2, shown schematically in dotted lines in FIGS. 21 and 22, and to a method for implementing such a facility 1, which method makes it possible in particular to prepare such an extrusion facility 1 for the production of such a profiled element 2.

Figure 1:
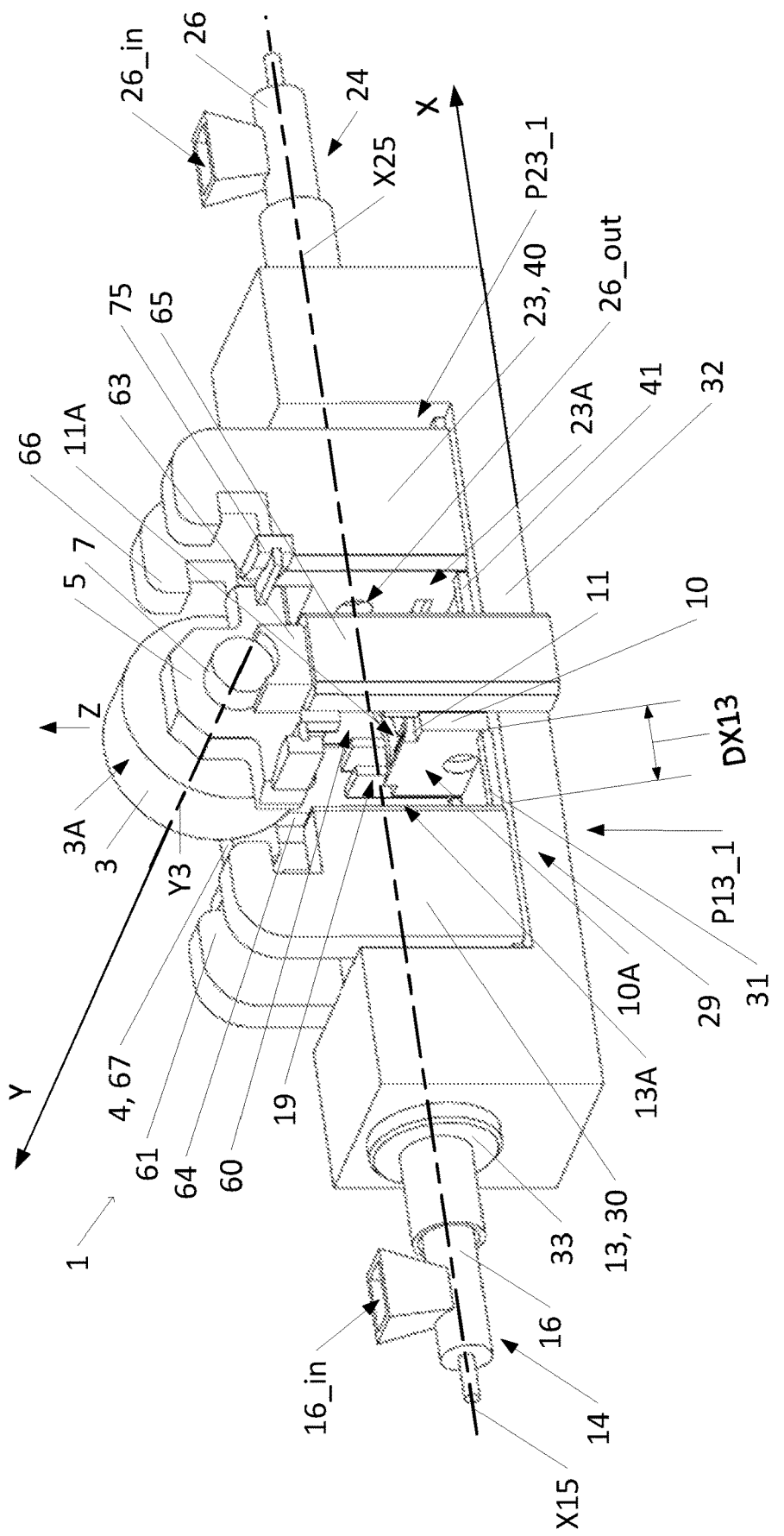
FIG. 1 shows, in a perspective view, an example of a facility according to the invention, in an open configuration in which the first and second head modules, which in this case each carry an extruder, are moved back at a distance from the first bearing and from the location provided for the tool module.

In a manner known per se, and as can be seen particularly clearly in FIGS. 1, 2 and 21, the extrusion facility 1 comprises a roller 3.

Said roller 3 has a shape of revolution, preferably a right cylinder shape, about a central axis Y3.

The radially outer surface of said roller 3 serves as a receiving surface 3A for receiving, cooling and dimensionally stabilizing the profiled element 2, as the latter is produced.

For better thermal management of the profiled element 2, and in particular for good management of the cooling of said profiled element, the roller 3 may have a thermal regulation system, comprising for example heat transfer fluid circulation channels, making it possible in particular to cool said roller.

The roller 3 is supported in rotation, about its central axis Y3, by at least a first bearing 4.

More preferably, the roller 3 comprises, projecting axially relative to the receiving surface 3A, axially on either side of said receiving surface 3A, a first axial extension 6 and a second axial extension 7 which embody the central axis Y3 of rotation.

The first axial extension 6 interacts in a pivot connection with the first bearing 4.

Likewise, the second axial extension 7 interacts in a pivot connection with a second bearing 5. The presence of two bearings 4, 5 arranged axially on either side of the roller 3 provides said roller 3 with particularly robust, balanced and stable rotational guidance.

Below, the observations relating to the first bearing 4, in particular the arrangements, functions and movements described in connection with the first bearing 4, may advantageously apply mutatis mutandis to the second bearing 5.

Byway of illustration, the roller 3 may preferably have a diameter of between 0.5 m and 10 m, for example between 0.90 m and 3 m.

By convention, the frontal plane, denoted PF, is considered to be the plane which is normal to the axis Y3 of the roller and which intersects said roller 3 in its middle, that is to say axially halfway between the first axial extension 6 and the second axial extension 7.

Likewise, by convention, the sagittal plane, denoted PS, is considered to be the plane perpendicular to the frontal plane PF and containing the axis Y3 of the roller 3.

Preferably, the facility 1 is arranged such that the frontal plane PF and the sagittal plane PS are vertical.

The facility 1 also comprises a tool module 10 which comprises a die 11 which is intended to interact with the roller 3, and more particularly which is intended to interact with the receiving surface 3A of said roller 3, so as to form an air gap 12 allowing the profiled element 2 to be shaped.

The die 11 preferably has for this purpose an end face 11A which partially covers the roller 3, over a predetermined angular sector around the central axis Y3 of said roller, and which has a concave curved shape with respect to the central axis Y3 of the roller, which shape substantially matches the shape of the receiving surface 3A of the roller. Preferably, said end face 11A has the shape of a right cylinder, centred on said central axis Y3.

The height H12 of the air gap 12 will be designated as the maximum distance, considered radially to the central axis Y3 of the roller, and therefore perpendicular to the receiving surface 3A of said roller, which separates the end face 11A of the die from the receiving surface 3A of the roller, in the area where the die 11 and the roller 3 mutually overlap in order to form walls intended to be in contact with the extruded material so as to delimit the thickness H2 of the profiled element 2.

In practice, by convention, it will be considered that the height H12 of the air gap 12 corresponds to the maximum height observed, over the width of said air gap 12, and therefore over the width W2 of the profiled element, at the outlet of said air gap 12, that is to say at the location where the die 11 is interrupted and therefore ceases to cover the receiving surface 3A of the roller 3 in azimuth around the central axis Y3, as can be seen in particular in FIGS. 9, 10, 13, 14, 21 and 22.

The useful width W11 of the end face 11A of the die, considered axially, that is to say in the direction of the central axis Y3 of the roller, as can be seen in FIGS. 3, 10, 14 and 22, that is to say the width of the end face 11A of the die which will delimit, with the receiving surface 3A of the roller, the air gap 12 through which the extruded material constituting the profiled element passes, which will therefore be in contact with the extruded material to delimit the cross section of the profiled element 2, and which therefore defines the width W2 of said profiled element 2 as can be seen in particular in FIG. 22, preferably covers at least 50%, and for example between 50% and 90% of the useful axial width W3 of said roller 3, that is to say of the axial width of the receiving surface 3A of the roller.

The facility 1 further comprises at least a first head module 13 which carries at least a first extruder 14 intended to supply a first constituent material of the profiled element 2.

Said first extruder 14 preferably comprises a screw 15 which is rotated about its longitudinal axis X15 in a sleeve 16, which sleeve 16 is secured to said first head module 13.

The sleeve 16 preferably has, in an upstream portion, an inlet 16_in, for example in the form of a hopper, for introducing the material to be worked, and, in a downstream portion, a downstream outlet 16_out which allows the material worked by the screw 15 of the extruder to leave said sleeve 16.

Said outlet 16_out is arranged such that it may be placed, as shown in particular in FIG. 21, in sealed communication with the tool block 10 in such a way as to be able to deliver to the die 11, via one or more channels 17 provided for this purpose in the tool block 10, the material which is extruded by the extruder 14.

The profiled element 2 is preferably made from at least one rubber-based material (or "compound").

In one possible application, the profiled element 2 will be formed of a single layer of just one homogeneous material, based on rubber.

In another possible application, the profiled element 2 will preferably be made from multiple materials of different compositions, based on rubber, said multiple rubber-based materials each being worked by at least one dedicated extruder 14, 24, conveyed through the tool module 10, then brought together, arranged and shaped by the die 11 and the air gap 12 into a profiled element 2, according to a desired design.

The compositions of the various materials which are juxtaposed in the straight cross section of the profiled element 2, and the positions and the dimensions of the locations of said materials in the straight cross section of the profiled element, will of course be predefined depending on the destination of said profiled element 2.

In this regard, note that said profiled element 2 is preferably intended to form a constituent part of a pneumatic tyre, for example a tread, a sidewall, or even, notably if said profiled element is particularly thin, a liner layer intended to form an interface between two layers superposed within the pneumatic tyre.

The profiled element 2 is advantageously produced continuously in the direction of its length, which defines a direction referred to as the "longitudinal direction" L2.

Preferably, while the extruded profiled element 2 is conveyed on the roller 3, said longitudinal direction L2 is parallel to the frontal plane PF, and preferentially contained in the frontal plane PF.

In cross section, perpendicular to the longitudinal direction L2, the profiled element 2 has, as can be seen in FIG. 22, a first dimension W2, considered in a direction parallel to the central axis Y3 of the roller 3 and corresponding to the width W2 of said profiled element, and a second dimension H2, considered radially relative to the central axis Y3, and therefore perpendicularly to the receiving surface 3A of the roller, and corresponding to the thickness H2 of said profiled element 2.

The thickness H2 of the profiled element is defined by the height H12 of the air gap and, taking into account in particular any swelling linked to the release of pressure stresses at the air gap outlet, said thickness H2 of the profiled element, when finished and stabilized, may generally represent between 50%, in particular if the speed of the roller 7 causes stretching of the profiled element 2 at the die outlet, and 200% of the height H12 of the air gap 12, considered at the outlet of said air gap 12, that is to say at the location where the die 11 ceases to cover the receiving surface 3A of the roller 3.

Note that the invention, thanks to the precision which it affords in the mechanical definition of the air gap 12, makes it possible to produce profiled elements 2, and in particular single-material profiled elements, which are particularly thin, and which have for example a final thickness H2 of between 0.1 mm and 0.5 mm.

More generally, however, it will be possible to generate profiled elements 2 in a wide range of thicknesses, for example profiled elements of which the thickness H2 is between 0.1 mm, which corresponds where applicable to the thinnest thickness achievable by the facility, and 150 mm, which corresponds where applicable to the maximum thickness achievable by said facility 1.

By way of illustration, the width of the profiled element W2, strictly greater than its thickness H2, may be between 1 cm and 150 cm. Where applicable, if the unit width W2 of the profiled element 2 allows, and in particular for profiled elements having a width of between 1 cm and 10 cm or even 20 cm, several separate profiled elements 2 may be extruded simultaneously, in parallel side by side, through the same tool module 10 and on the same roller 3.

When the profiled element 2 has a particularly thin thickness H2 of between 0.1 mm and 0.5 mm as stated above, the width W2 of the profiled element may be between 1 cm and 150 cm. In the case of a very thin profiled element, the ratio W2/H2 between the width W2 and the thickness H2 may thus preferably be between 100 times and 3,000 times.

According to the invention, the method comprises an engagement step (s1), which constitutes a "first stage" in the closure sequence, during which engagement step (s1) the tool module 10 is moved relative to the first head module 13 and to the first bearing 4 in a first direction Z referred to as the "engagement direction" Z, in such a way as to bring said tool module 10 into abutment against the first bearing 4 (FIGS. 9, 10, 11), in this case therefore to place the tool module 10 in abutment against the bearing 4 carrying the roller 3, and to subject said tool module 10 to a preload force F_Z which is oriented in the engagement direction Z and counter to the first bearing 4 (FIGS. 12, 13, 14, 15), in such a way as to place said tool module 10 relative to the roller 3, and more particularly to place the end face 11A of the die 11 relative to the receiving surface 3A of the roller 3, in a configuration referred to as the "engagement configuration" which defines the desired air gap 12 for producing the profiled element 2.

This engagement configuration with a preload force F_Z is achieved in FIGS. 13 to 15, then maintained in FIG. 16 which corresponds to a clamping step (s2) which will be described in detail below, and in FIGS. 21 and 22 which correspond to the performance of an operation for extrusion of a profiled element 2.

To carry out the engagement step (s1), the facility 1 comprises an engagement device 19, which makes it possible to move the tool module 10 relative to the first bearing 4 and relative to the first head module 13 in a first direction (the abovementioned first direction Z), referred to as the "engagement direction" Z, in such a way as to be able alternatively to:

either bring the tool module 10 towards the roller 3, in this case with an engagement movement denoted MZ+, until said tool module 10 is in abutment against a docking stop 18 which is rigidly secured to the first bearing 4 (FIGS. 9 and 10), and subject said tool module 10 to a preload force F_Z (FIGS. 13 and 14) which is oriented in the engagement direction Z and counter to said docking stop 18 and the first bearing 4, in such a way as to place said tool module 10 relative to the roller 3, and more particularly in such a way as to place the end face 11A of the die 11 relative to the receiving surface 3A of the roller 3, in a configuration referred to as the "engagement configuration" (FIGS. 13 to 15, then also 16, 21 and 22) which defines the desired air gap 12 for producing the profiled element 2, or conversely move said tool module 10 away from the roller 3 and from the docking stop 18, in this case with an away movement denoted MZ−, so as to place said tool module in a disengagement configuration (FIGS. 1 to 6, 24 and 25), distinct from the engagement configuration.

Advantageously, the docking stop 18 will guarantee the precision and reproducibility of the height H12 of the air gap 12 chosen.

Preferably, the air gap 12 thus obtained in the engagement configuration will have a height H12, considered radially relative to the roller 3, which is between 0.1 mm and 150 mm, and for example between 0.1 mm and 0.5 mm, for producing thin profiled elements, in particular profiled elements of which the final thickness, after cooling and stabilization, will be between 0.2 mm and 0.3 mm. It will be recalled in this regard that the thickness of the profiled element 2 may vary, and where applicable be adjusted in a controlled manner, depending on the one hand on the possible degree of longitudinal stretching that is exerted on the profiled element 2 with the roller 3, which stretching tends to reduce the thickness of the profiled element, and on the other hand on the natural tendency of the material to "proliferate", that is to say to increase in volume, which tends to spontaneously increase the thickness of the profiled element once it has come out of the air gap 12.

In the disengagement configuration, the distance DZ between the receiving surface 3A of the roller and the end face 11A of the die, and, more preferably, the smallest distance measured in the engagement direction Z and separating the receiving surface 3A from the end face 11A of the die, will be, as can be seen in particular in FIG. 24, strictly greater than that observed in the engagement configuration, and will preferably be equal to or greater than 20 cm, or even equal or greater than 50 cm, in such a way as to allow the tool module 10 to be sufficiently set back from the roller 3 to allow easy access to the receiving surface 3A of the roller 3, and, where necessary, to allow cleaning of the roller 3 and/or easy cleaning or replacement of the tool module 10.

Preferably, the engagement direction Z is contained in the sagittal plane PS, and, more preferably, corresponds to the line of intersection of the frontal plane PF with the sagittal plane PS.

Preferably, the engagement direction Z is vertical, or at least substantially vertical, for example within an inclination range from +10 degrees to −10 degrees relative to the vertical.

In this way, the engagement movement MZ+, respectively the away movement MZ−, will preferably correspond to a predominantly or even exclusively vertical movement, typically a vertical translational movement.

Preferably, the engagement movement MZ+, respectively the away movement MZ−, will be a rectilinear translational movement, parallel to the engagement direction Z.

The engagement device 19 may comprise any conveyor mechanism 20 which makes it possible to convey the tool module 10 in the engagement direction Z, preferably in rectilinear translation, from its disengagement configuration to its engagement configuration and vice versa.

Preferably, the engagement device 19 comprises a conveyor mechanism 20 formed by a lift 20 which makes it possible to convey the tool module 10 in the vertical engagement direction Z, in order to, alternatively, execute an upward forward movement (engagement movement MZ+) by raising said tool module 10 to bring it towards the roller 3, or conversely execute a downward backward movement (away movement MZ−) by lowering said tool module 10 to move it away from the roller 3 and the docking stop 18 of the first bearing 4. Purely for convenience in the description, the conveyor mechanism 20 will equate to a lift 20 below.

Furthermore, the engagement device 19 will preferably comprise at least one, and preferably two, preloading actuators 21, 22, arranged in such a way as to be able, when the tool module 10 is in contact with the docking stop 18 of the first bearing 4, to increase the compressive force exerted by the tool module 10 against said docking stop 18, and therefore more generally against the first bearing 4, and thus to generate the desired preload force F_Z, as shown in FIGS. 13 and 14.

Figure 16:
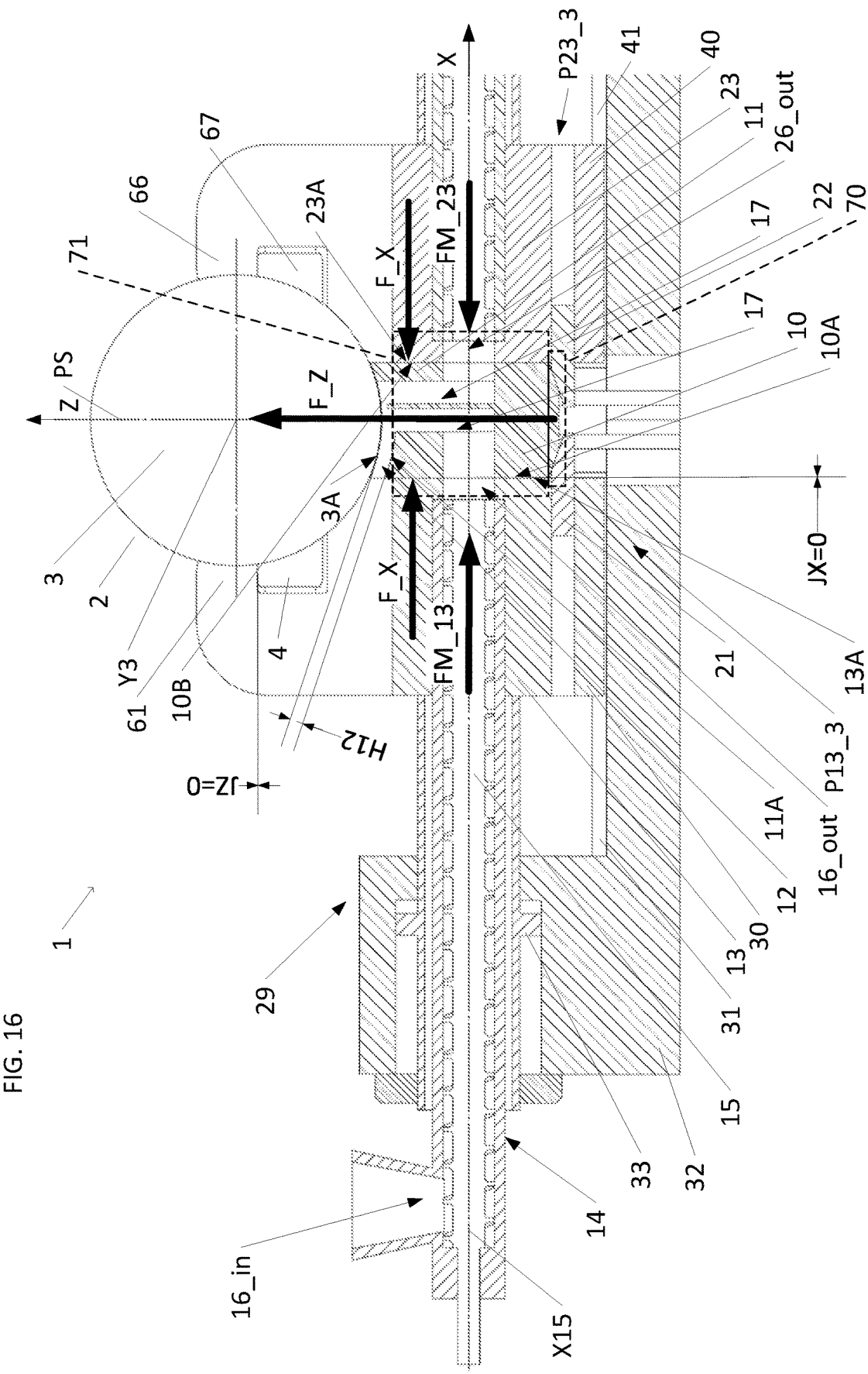
FIG. 16 shows, in a partial view in cross section through the frontal plane, the facility of the preceding claims in a closed configuration in which the first head module and the second head module have been brought into abutment against the tool module, in opposition to one another on either side of said tool module, and thus exert against said tool module a clamping force so as to hold said tool module in its engagement configuration by clamping, and to ensure leaktight communication between the extruders and said tool module, in such a way as to be able to convey the materials extruded from the extruders to the die and to the air gap, through said tool module, so as to produce the desired profiled element.

As shown in FIGS. 9, 13 and 16, these preloading actuators 21, 22 may preferably comprise sloped sliders, which are mounted so as to be movable in a direction transverse to the engagement direction Z, moved for example by cylinders or any other suitable motorization system, and which engage the tool module 10, by performing forward movements here denoted FM_21 and FM_22 in FIG. 13.

Preferably, for the sake of compactness of the facility and stability, the preloading actuators 21, 22 engage the tool module 10 via the base or "butt" of said tool module 10, which is located at the end opposite to the end having the die 11.

Furthermore, preferably, the lift 20 on the one hand, and the preloading actuators 21, 22 on the other hand, will preferably be arranged in such a way as to have a differential and complementary action, in that the lift 20 will be capable of performing a movement of the tool module 10 in the engagement direction Z within the limit of a travel of predetermined maximum amplitude, referred to as the "large amplitude", sufficient to bring the tool module 10 from its disengagement configuration into the configuration in which said tool module 10 comes into contact with the docking stop 18, while the preloading actuators 21, 22 will then take over to continue the engagement movement MZ+ in this same engagement direction Z, over a travel which will be of an amplitude strictly smaller than the large amplitude of the lift 20, but with the ability to generate a strong stress against the tool module 10 and the docking stop 18, such as to be able to achieve the desired preload force F_Z.

In other words, and as will be described in detail below, the lift 20 will preferably perform a first phase of the engagement step (s1), corresponding to an approach phase (s1_1), providing most of the amplitude of the movement necessary for the engagement movement MZ+, but being only capable of generating a relatively moderate preload stress, lower than the target preload force F_Z, while the preloading actuators 21, 22 will then complete the engagement step (s1) by carrying out a second phase, referred to as the "preloading phase" (s1_2), with only a low capacity for moving the tool module 10 in the engagement direction Z, but with a strong capacity for generating a stress in the engagement direction Z, making it possible to reach the desired intensity of preload force F_Z.

Preferably, to ensure that the preloading actuators 21, 22 can operate independently of the lift 20 (and vice versa), said preloading actuators 21, 22 will be supported, unlike the lift 20, by the head module or modules 13, 23.

By way of illustration, the preload force F_Z is preferably between 300 kN and 1,500 kN, i.e. approximately the equivalent of 30 tonnes to 150 tonnes. For example, the preload force could be of the order of 600 kN, i.e. approximately 60 tonnes.

Advantageously, such a preload intensity makes it possible to sufficiently prestress the tool module 10 and its die 11 against the first bearing 4, and therefore against the roller 3 carried by said first bearing 4, to be able to subsequently offset at least partially, or even totally, the effects which will result from the pressure stresses generated in the air gap 12 by the flow of the materials extruded during the production of the profiled element 2.

According to the invention, the method then comprises, after the engagement step (s1), a clamping step (s2), which constitutes a "second stage" in the closure sequence, and during which, while said tool module 10 is in its engagement configuration, prestressed against the first bearing 4 by the preload force F_Z, as shown in FIGS. 12 to 15, said tool module 10 is clamped, as shown in FIG. 16, between the first head module 13 having the first extruder 14 and a second head module 23 distinct from the first head module 13, by moving said first head module 13 and the second head module 23 towards one another, on either side of the tool module 10, in a second direction X referred to as the "coupling direction" X which is transverse to the engagement direction Z, preferably perpendicular to said engagement direction Z, in such a way as to place the first extruder 14 in communication with the tool module 10, and by subjecting said first and second head modules 13, 23 to a clamping force F_X which is oriented in said coupling direction X, in such a way as to hold the tool module 10 by compression between the first head module 13 and the second head module 23.

Advantageously, the tool module 10 is thus firmly held in a vice grip between, and by, the first head module 13 and the second head module 23, which each bear on the tool module 10, in opposition to one another in the coupling direction X. The tool module 10 is therefore firmly held by the first and second head modules 13, 23 in a fixed position relative to the first bearing 4 and to the central axis Y3 of the roller, which makes it possible to keep the arrangement of the air gap 12 constant during the production of the profiled element 2.

To be specific, thanks to the robust clamping of the tool block 10 provided by the invention, the dimensions of the air gap 12, and in particular the height H12 of said air gap, are almost insensitive to the intensity of the pressure under which the material is delivered by the die 11 into the air gap 12, and therefore almost or even totally unchanged during the extrusion process making it possible to generate the profiled element 2. Said profiled element 2 is therefore very regular, in particular as regards its thickness H2.

As will be described in detail below, the facility 1 comprises a coupling device 29 which gives the first head module 13 and/or the second head module 23 its own mobility relative to the first bearing 4 and relative to the tool module 10 in the coupling direction X, transverse to the engagement direction Z.

"Transverse", or "oriented transversely", means, in the general sense of such an expression, that a direction is arranged obliquely, preferably perpendicularly, to a reference direction.

More particularly in this case, the engagement direction Z and the coupling direction X will be concurrent and will be substantially perpendicular, that is to say that they will form between them an angle of between 70 degrees and 110 degrees, preferably between 80 degrees and 100 degrees, preferably between 85 degrees and 95 degrees, or even preferably exactly perpendicular, that is to say that they will form between them an angle equal to 90 degrees.

Furthermore, the coupling direction X is preferably contained in the frontal plane PF. Even more preferably, said frontal plane PF is the plane defined by the engagement direction Z and by the coupling direction X.

By convention, Y will denote the direction parallel to or even coincident with the axis of the roller Y3 and forming with the coupling direction X and the engagement direction Z a rectangular trihedron.

Note that, advantageously, the use of a coupling direction X and an engagement direction Z which are intersecting, preferably perpendicular, makes it possible to distribute the various components of the facility 1, including in particular the lift 20 of the engagement device which makes it possible to move the tool module 10, the head modules 13, 23, their respective extruders 14, 24 and their coupling device 29, in different directions in space, relative to the roller 3, to the air gap 12, around the location, referred to as the "core location" 60, occupied by the tool module 10 in the engagement configuration. It is thus possible to simultaneously optimize the compactness of the facility 1 while guaranteeing excellent accessibility to the various components of said facility 1.

Furthermore, such an arrangement allows the engagement device 19 and the coupling device 29 to each contribute to holding the tool module 10 in its engagement configuration. It is thus possible to reinforce the holding of the tool module 10 by combining the effects of actuators which are distributed and which act in different directions, but which together contribute to maintaining the desired configuration of the air gap 12 against the pressure of the extruded materials, and more particularly which contribute to giving the tool module 10 the ability to resist moving back from the roller 3.

Furthermore, the coupling direction X will preferably be substantially or even exactly horizontal, in particular when the engagement direction Z is substantially or even exactly vertical. Thus, the coupling direction X will preferably form an angle of less than 20 degrees, preferably less than 10 degrees, more preferably less than 5 degrees, or even zero degrees, with respect to the horizontal.

The horizontality of the coupling direction X will advantageously offer great stability, and will make it possible to limit the expenditure of energy in the movement of the first head module 13 and/or the second head module 23, which are particularly heavy components.

Such an arrangement will also promote access to the extruder 14 for cleaning or supply of material, since, in particular, when the first head module 13 and its extruder 14 move in the coupling direction X, they remain at all times at a substantially constant altitude, and therefore at the working height of the operator.

Furthermore, the second head module 23 preferably has features which are similar, or even identical, to those of the first head module 13.

Thus, preferably, and as can be seen in FIGS. 1, 2, 5, 6, 9, 13, 16, 20, 21 and 23 to 25, the second head module 23 carries a second extruder 24, intended to deliver into the air gap 12, via the tool block 10 and the die 11, a second material, preferably having a composition different to the first material delivered by the first extruder 14, and preferably based on rubber.

Said second extruder 24 preferably comprises a screw 25 mounted rotatably about its longitudinal axis X25 in a second sleeve 26 which is secured to the second head module 23 and which has an inlet 26 in and an outlet 26_out.

The longitudinal axis X25 of the second extruder 25 is preferably colinear (parallel) with the longitudinal axis X15 of the first extruder 14, or even coaxial with the longitudinal axis X15 of the first extruder 14.

As can be seen in particular in FIGS. 1, 2, 6, 13, 16 and 21, the first head module 13 advantageously has an end face 13A, referred to as the "first connection face" 13A (or "first downstream face"), on which the outlet 16_out of the sleeve 16 of the first extruder 14 opens out, and which is arranged so as to be, when the facility is in the closed configuration, in sealed contact with a corresponding face 10A of the tool module 10, referred to as the "first receiving face" 10A, which has a shape matching the shape of said first connection face 13A, and which has, facing the outlet 16_out of the sleeve 16, an intake which forms the entrance to the corresponding channel 17, which channel 17 then continues through the tool block 10 to the die 11 via which said channel 17 opens into the air gap 12.

Similarly, the second head module 23 has an end face 23A, referred to as the "second connection face" 23A (or "second downstream face"), on which the outlet 26_out of the sleeve 26 of the second extruder 24 opens out and which is arranged so as to be, when the facility is in the closed configuration, in sealed contact with a corresponding face 10B of the tool module 10, referred to as the "second receiving face" 10B, which is located opposite the first receiving face 10A in the coupling direction X, with respect to the sagittal plane PS, which has a shape matching the shape of said second connection face 23A, and which has, facing the outlet 26_out of the sleeve 26, an intake which forms the entrance to the corresponding channel 17.

Note that the first extruder 14 and the second extruder 24 preferably each feed a different channel 17 within the tool module 10, such that the first material from the first extruder 14 is routed to the die 11 separately from the second material from the second extruder 24, without said materials joining or mixing before reaching the die 11, and more preferably without said materials joining or mixing before reaching the air gap 12.

Preferably, the first connection face 13A and the first receiving face 10A are flat. Preferably, these faces 13A, 10A form an angle of less than 20 degrees, less than 10 degrees, or even less than 5 degrees with respect to the plane normal to the coupling direction X (and therefore, preferably with respect to the engagement direction Z), or, even more preferably, they are normal to said coupling direction X (and therefore, preferably, parallel to the engagement direction Z, and therefore, preferably, vertical).

Likewise, the second connection face 23A and the second receiving face 10B are flat. Preferably, these faces 23A, 10B form an angle of less than 20 degrees, less than 10 degrees, or even less than 5 degrees with respect to the plane normal to the coupling direction X, or, even more preferably, they are normal to said coupling direction X.

Preferably, to simplify the layout of the facility 1, in particular the layout of the engagement device 19, and to ensure good stability in the closed configuration, the first and second receiving faces 10A, 10B which delimit the tool module 10 in the coupling direction X, and between which are located the channel or channels 17 conveying the compound or compounds extruded from the extruder or extruders 14, 24, are parallel to one another, and preferably, moreover, parallel to the engagement direction Z.

Likewise, the first connection face 13A of the first head module 13 and the second connection face 23A of the second head module 23 are preferably parallel to one another, and preferably, moreover, parallel to the engagement direction Z.

According to one possible preferred combination of the aforementioned features, which corresponds to the alternative embodiments illustrated in the various figures, the tool module 10 is delimited, in the coupling direction X, by a first receiving face 10A against which the first head module 13 is intended to come into abutment in the closed configuration so as to place the first extruder 14 in communication with the tool module 10 and apply a clamping force F_X, and by a second receiving face 10B against which the second head module 23 is intended to come into abutment in the closed configuration so as to apply the clamping force F_X, and said first and second receiving faces 10A, 10B are flat and each has an orientation, with respect to the engagement direction Z, which is such that the angle of inclination between the receiving face 10A, 10B concerned and the engagement direction Z is less than 10 degrees, preferably less than 5 degrees, and preferably zero, such that said first and second receiving faces 10A, 10B are substantially or even preferably exactly parallel to one another and substantially or even exactly parallel to the engagement direction Z, and the coupling direction X forms an angle of between 70 degrees and 110 degrees, preferably between 80 degrees and 100 degrees, and even more preferably equal to 90 degrees, with respect to the engagement direction Z, and more preferably with respect to said first and second receiving surfaces 10A, 10B.

Advantageously, the junction planes along which the head modules 13, 23 bear in a sealed manner against the tool module 10 in the closed configuration are thus preferably flat surfaces, parallel to one another and parallel to the engagement direction Z, and normal to the direction of coupling X, which simplifies the opening and closing movements, and increases the stability in the closed configuration.

Furthermore, with the first extruder 14 comprising at least one screw 15 rotated about its longitudinal axis X15 in a sleeve 16, as mentioned above, then said longitudinal axis X15 is preferably parallel to the coupling direction X to within +/−10 degrees, preferably +/−5 degrees, and more preferably exactly parallel to said coupling direction X.

Advantageously, such an arrangement will make it possible in particular to optimize the bulk of the facility 1 as well as accessibility to the first extruder 14 for cleaning operations. Said arrangement also makes it possible to simplify, and make more secure, the movements of the extruder 14 and of the associated head module 13 in the coupling direction X, since these movements FM_13, BM_13 take the form of longitudinal translation of the extruder 14, thereby minimizing the floor area covered by said extruder during said movements.

Advantageously, the channels 17 of the tool module 10 will preferably each have at least one angular member (elbow) comprising an upstream segment which extends substantially or even exactly parallel to the coupling direction X, and which allows them to capture, through their intake, the extruded material coming from the sleeve 16, directly in the axial extension of said sleeve 16 and the screw 15, then a downstream segment, substantially parallel to the engagement direction Z, which forms an angle, in this case preferably a right angle, with the upstream segment in order to direct the flow of extruded material towards the air gap 12 and the roller 3, in a direction of flow which is substantially or even exactly parallel to the engagement direction Z.

Preferably, the tool module 10 comprises a plurality of plates which are stacked in the direction of their thickness in the coupling direction X, the larger faces of which are flat and parallel to the first receiving face 10A and to the second receiving face 10B, and therefore preferably parallel to the engagement direction Z. Preferably, the visible face of the first plate of the stack forms the first receiving face 10A, while the visible face of the last plate of the stack forms the opposite second receiving face 10B.

Each channel 17 is thus hollowed out in the thickness of a plate, or in the respective thicknesses of two contiguous plates, forming a groove with a blind bottom and the recess of which opens out at the surface of the plate in question, that is to say the recess of which opens out in the junction plane with the neighbouring plate, such that, once the plates are brought together in contact with one another, the cross section of said channel, through which the flow of extruded material is intended to pass, is delimited, following a closed contour, by the two superposed plates which surround said channel 17.

Of course, each inlet of a channel 17 will cut across as many plate thicknesses as necessary, from the receiving face 10A, 10B in question, to reach the depth of the plate in which said channel 17 is hollowed out.

The die 11 is advantageously located on a face of the stack of plates, and more generally of the tool module 10, which is secant, or even perpendicular, to the receiving faces 10A, 10B. In this case, the die 11 is located, and opens out, on the upper edge of the tool module 10. The angle of bending of the channels 17 advantageously makes it possible to transfer each extruded material from the receiving face 10A, 10B in question to the die 11 and its end face 11A.

Advantageously, in the closed configuration, the clamping force F_X presses the plates against one another, in the direction of their thickness.

Such sandwiching of the stack of plates by means of the connection faces 13A, 23A of the first and second head modules 13, 23, in particular when said sandwiching takes place over an area of the tool module 10 which preferably covers, in the engagement direction Z, more than half the length of the channels 17 considered in said engagement direction Z, preferably more than 75% of said length of the channels 17, or even all of the length of said channels 17 considered in the engagement direction Z, advantageously allows the tool module 10 to be held particularly stably and guarantees perfect sealing of the tool module 10, notably by opposing any separation of the plates from one another, at the interfaces formed by the junction planes between the various plates, under the effect of the pressure of the extruded materials flowing in the channels 17.

According to one possible arrangement corresponding to the first alternative facility shown in FIGS. 1 to 25, the first head module 13, and preferably each of the first and second head modules 13, 23, may carry one and only one extruder 14, 24.

Figure 26C:
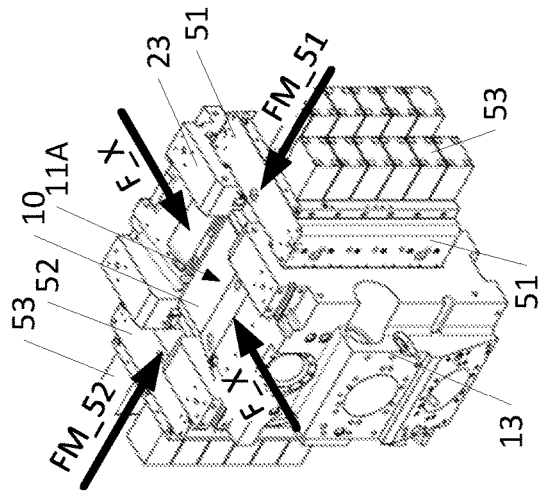
FIGS. 26A, 26B, and 26C show, in perspective detail views, the successive steps of implementation of a locking mechanism, applicable in particular to the facility according to FIGS. 1 to 25, said locking mechanism comprising a first and a second jaw which each come into engagement on the first head module and on the second head module to force said first and second head modules to move towards one another and generation of the clamping force that said head modules exert on the tool module.
Figure 26B:
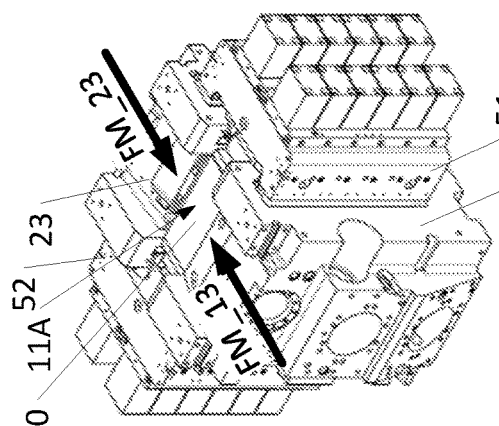
Figure 26A:
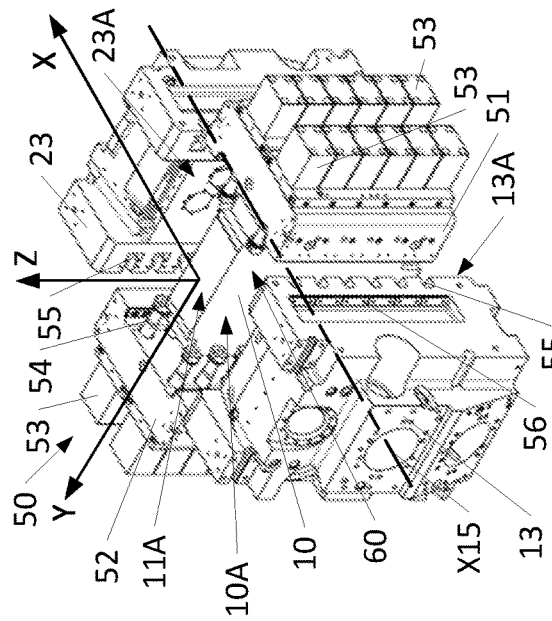

However, and as is the case of the second alternative facility 1 shown in FIGS. 26A, 26B, 26C, the first head module 13 and/or, analogously, the second head module 23, may carry several extruders, and thus preferably feed as many separate channels 17 within the tool module 10.

Each extruder 14, 24 will preferably open out on the connection face 13A, 23A of the head module 13, 23 which carries the extruder in question, opposite an intake which forms the inlet of a corresponding channel 17 provided in the tool module 10. In this regard, each head module 13, 23 will preferably include, to connect the sleeves 16, 26 of the extruders to its connection face 13A, 23A, as many pathways, preferably separated from one another, as said head module 13, 23 may have separate extruders 14, 24.

To implement the second clamping step (s2), the facility 1 comprises, in addition to a second head module 23 as described above, a coupling device 29 which gives the first head module 13 and/or the second head module 23 its own mobility relative to the first bearing 4 and relative to the tool module 10 in a second direction X, in this case the second direction referred to as the "coupling direction" X mentioned above, which is oriented transversely to the engagement direction Z, preferably perpendicularly to said engagement direction Z, so that said coupling device 29 makes it possible alternatively:

either to bring the first head module 13 and the second head module 23 towards one another in said coupling direction X, on either side of the tool module 10, when said tool module 10 is in the engagement configuration, in such a way as to place the first extruder 14, respectively the second extruder 24 where applicable, in communication with the tool module 10 and to clamp said tool module 10 between the first head module 13 and the second head module 23, in a configuration referred to as the "closed configuration", or conversely to move the first head module 13 away from the second head module 23 in the coupling direction X, in such a way as to disengage the first extruder 14, respectively the second extruder 24, from the tool module 10 and to release the tool module 10 to allow a movement of said tool module 10 relative to the bearing 4, preferably likewise relative to the second bearing 5, and relative to the first and second head modules 13, 23 in the engagement direction Z.

According to an alternative implementation, it could be envisaged that only one of the head modules 13, 23 be movable relative to the first bearing 4 and relative to the tool module 10 in the coupling direction X, the other head module 23, 13 being fixed in said coupling direction X, such that the movement of the single movable head module 13 against the tool module 10 and the other fixed head module 23 would suffice to reach the closed configuration and to generate the clamping force F_X.

However, preferably, the coupling device 29 gives each of the first and second head modules 13, 23 its own mobility in the coupling direction X, relative to the first bearing 4 (and, likewise, relative to the second bearing 5) and relative to the tool module 10.

In this way, the first head module 13, located on a first side of the sagittal plane PS, is capable of moving in the coupling direction X, preferably in rectilinear translation in said coupling direction X, in such a way as to be able, alternatively, to move towards said sagittal plane PS, to the tool module 10, and to the second head module 23, until it can engage said tool module 10, with a forward movement FM_13 (FIG. 6), or to move away from said sagittal plane PS, from the tool module 10, and from the second head module 23, in particular in order to disengage from the tool module 10, with a backward movement BM_13 (FIG. 23), while, likewise, the second head module 23, which is located on the other side of the sagittal plane PS, is also capable of moving in the coupling direction X, preferably in rectilinear translation in said coupling direction X, and preferably independently of the movements of the first head module 13, in such a way as to be able, alternatively, to move towards said sagittal plane PS, to the tool module 10, and to the first head module 13, until it can engage said tool module 10, with a forward movement FM_23 (FIG. 6) opposite to the forward movement FM_13 of the first head module 13, or conversely to move away from said sagittal plane PS, from the tool module 10 and from the first head module, in particular in order to disengage from the tool module, with a backward movement BM_23 (FIG. 23) opposite to the backward movement BM_13 of the first head module 13.

Note that the forward movements FM_13, FM_23, respectively the backward movements BM_13, BM_23, of the first and second head modules 13, 23, although being preferably potentially controllable independently from one head module 13 to the other head module 23, are nevertheless preferably synchronized, in particular during the closure, such that the first head module 13 and the second head module 23 are preferably moved simultaneously, substantially mirroring one another about the sagittal plane PS, with movements which are therefore carried out in opposition to one another.

Preferably, and as can be clearly seen in FIGS. 1, 2, 5, 6, 9, 12, 16 to 18, 20 and 23 to 25, the coupling device 29 comprises at least a first carriage 30 which carries the first head module 13, which is even formed in one piece with said first head module 13, and which is mounted movably and guided in translation along a first rail 31, preferably straight, and preferably horizontal, which thus embodies the coupling direction X.

The first rail 31 preferably constitutes a fixed element of the facility 1, forming part of a frame 32 in relation to which, on the one hand, the movements FM_13, FM_23, BM_13, BM_23, preferably horizontal, of the head modules 13, 23, and in this case more specifically of the first carriage 30, are performed in the coupling direction X, and on the other hand the movements MZ+, MZ−, preferably vertical, of the tool module 10, and more specifically of the lift 20, are performed in the engagement direction Z.

Said frame 32, and consequently the first rail 31 which is rigidly secured to said frame 32, is preferably secured to the floor of the workshop in which the facility 1 is located.

Preferably, for greater stability, the first carriage 30 is guided in translation on a pair of first rails 31 parallel to one another.

The first carriage 30 may be propelled by any suitable drive means 33, such as an electric motor or a cylinder 33, preferably a hydraulic cylinder, for example an annular cylinder 33 housed in the frame 32. Said drive means 33 will advantageously be controlled by a control unit, preferably electronic.

Thus, the first head module 13 may advantageously move back and forth, in this case in one piece with the first carriage 30, along the first rail 31, in the coupling direction X, in order to:

sometimes move away from the tool module 10, with a backward movement BM_13, and more precisely move away from the location referred to as the "core location" 60 which is reserved for the tool module 10, and which is occupied by the tool module 10 when the facility 1 is in the engagement configuration and in the closed configuration, until it reaches a first position, referred to as the "fully open position" P13_1, which corresponds to an open configuration (FIGS. 1 and 23 to 25), and which in particular allows the operator to access the first head module 13, and in particular its first connection face 13A, with a view to cleaning, sometimes move towards the core location 60 and therefore the tool module 10 (FIGS. 5, 6 then 16 and 20), with a forward movement FM_13, until it reaches, first of all, a second position P13_2, referred to as the "intermediate position" P13_2 (FIGS. 6, 9 and 13), closer to the tool module 10 than the fully open position P13_1, which preferably allows, as will be described in detail further below, the first head module 13 to interact with the first bearing 4 while providing a passage clearance JX (non-zero) allowing free movement of the tool module 10 in the engagement direction Z, and then, by continuing the forward movement FM_13, a third position referred to as the "contact position" P13_3 (FIG. 16), even closer to the tool module 10 and to the core location 60, in which, as is particularly the case in the closed configuration (FIGS. 16 and 21), the end face 13A of the first head module 13, referred to as the "first connection face 13A", is in sealed contact with the corresponding face of the tool module 10, referred to as the "first receiving face 10A", to ensure a sealed joint which allows continuity of flow of the first material between the first extruder 14 and the corresponding channel 17 of the tool module 10.

Figure 5:
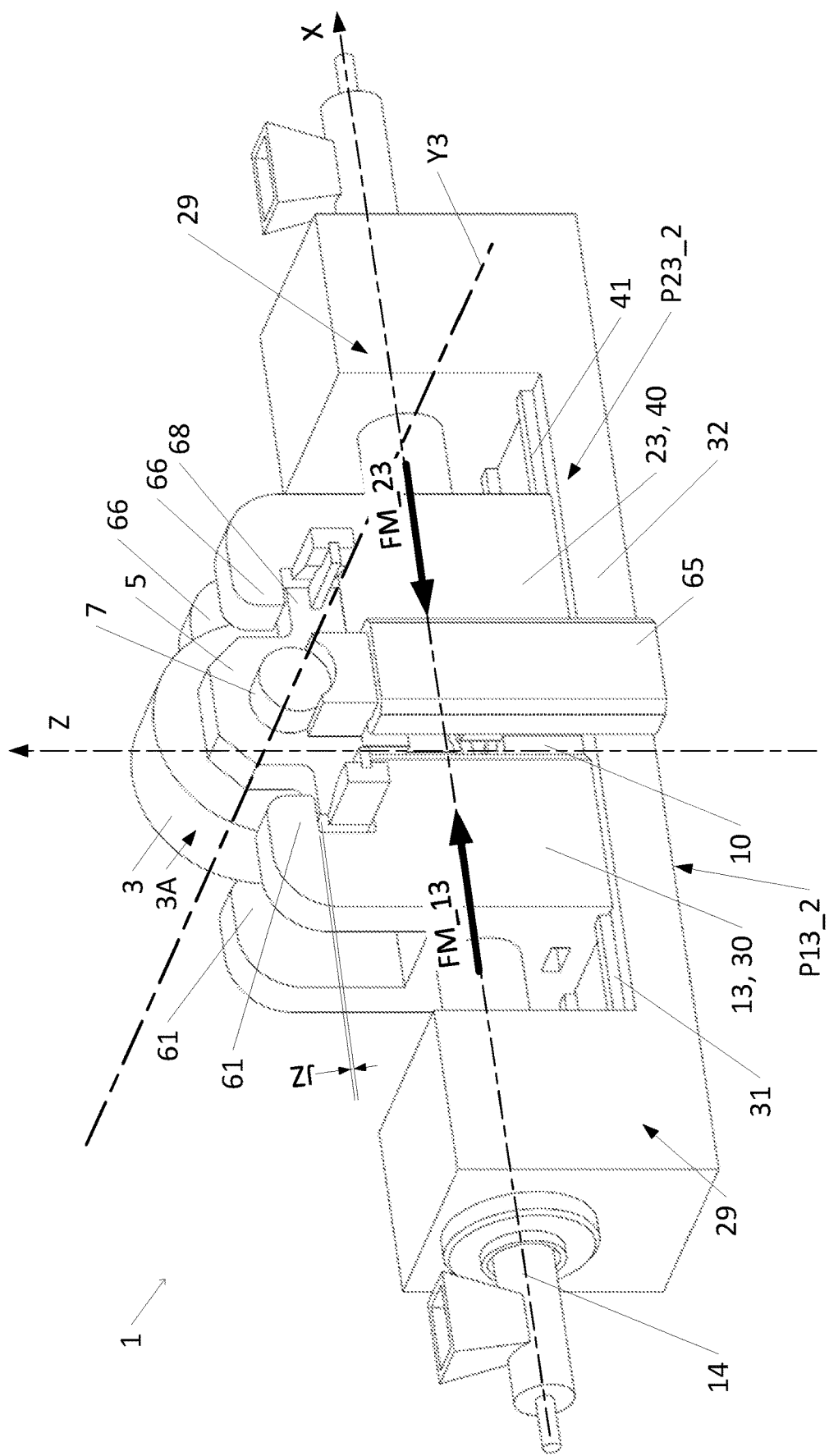
FIG. 5 shows, in a perspective view, the facility of FIGS. 1 to 4 in a pre-positioning configuration, according to which the first and second head modules have been moved towards one another, on either side of the location intended for the tool block, in such a way as to define between them a passage for the tool module, and in which the respective retaining hooks of said first and second head modules are positioned facing the first bearing, in this case above the lateral extensions of the base of said first bearing, so as to form stops intended to limit the movement of said first bearing in the engagement direction.
Figure 12:
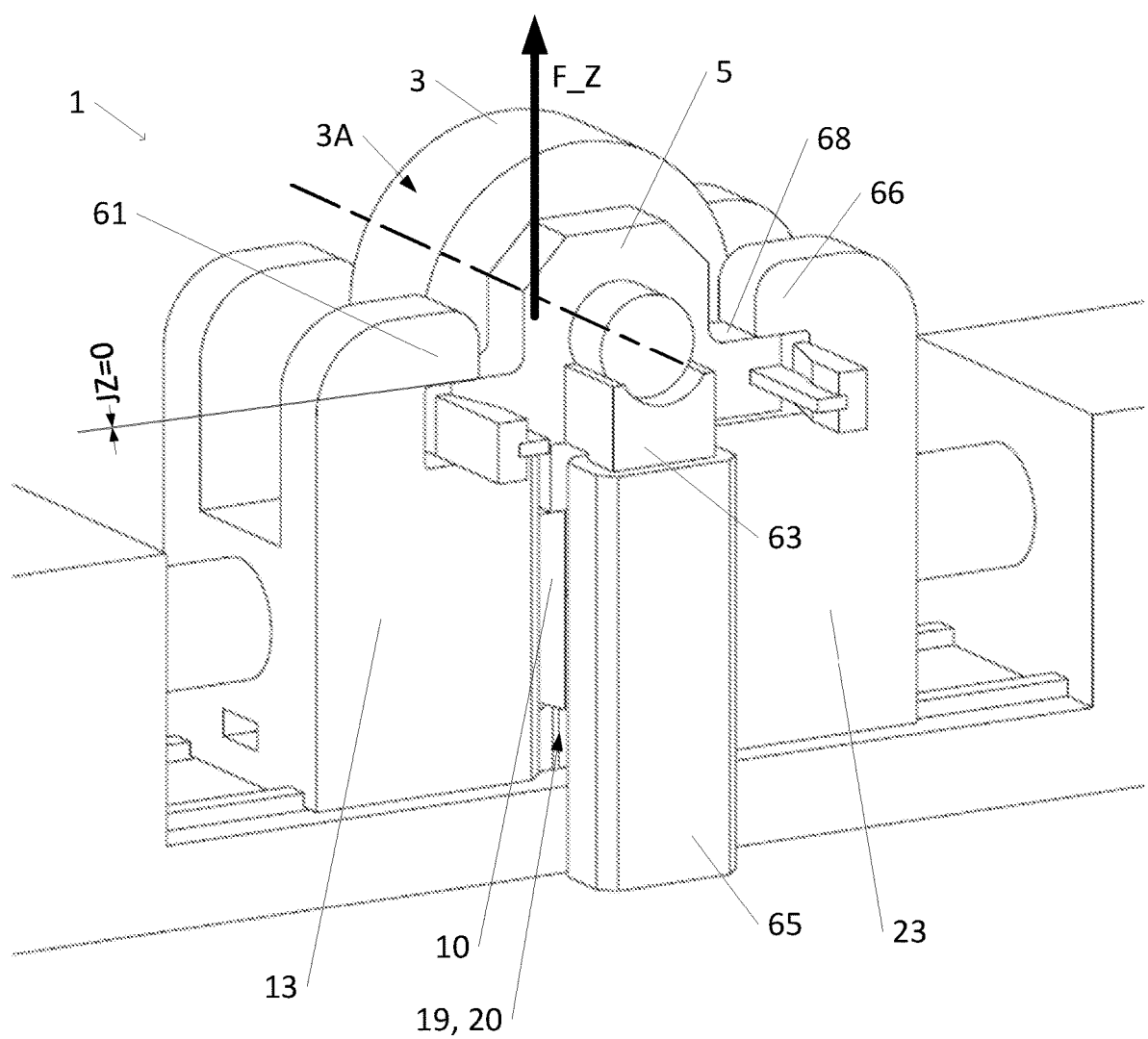
FIG. 12 is a partial perspective view of the facility of the preceding figures, in an engagement configuration, resulting from a preloading phase which followed the approach phase, and in which the tool module, positioned at a distance from the roller which corresponds to the desired air gap, exerts a preload force against the first bearing, in the engagement direction, thus pressing the base of said first bearing into abutment against the retaining hooks of the first and second head modules, which are themselves still in the pre-positioning configuration.

By way of illustration, the useful travel of the first carriage 30, and therefore of the first head module 13, which separates the contact position P13_3 from the fully open position P13_1 in the coupling direction X, and which is here denoted DX13, will be equal to or greater than 50 cm, and for example between 1 m and 2 m, in particular in order to provide a sufficient gap to allow an operator to easily access the first connection face 13A of the first head module 13, the first extruder 14, and where appropriate the core location 60 and the receiving surface 3A of the roller, when the facility is in the open configuration. Note, however, that it is also possible to provide, after a production cycle, when it is simply desired to replace the tool module 10 but without changing the material or materials used, an open position which corresponds to a simple release of the clamping force F_X, in which the first head module 13 moves back very slightly relative to the tool module 10 in the coupling direction X, in such a way as to move apart from the tool module just enough to allow movement and removal, in this case vertically downwards, of the tool module 10, and shearing of any bridges of rubber compound remaining between the head module 13 and the tool module 10. In this case, the distance by which it moves back may be chosen as being simply non-zero, for example equal to or greater than 0.5 mm, or even equal to or greater than 1 mm. It will thus be possible to choose in particular a move-back distance of between 0.5 mm and 5 cm or even between 0.5 mm and 10 cm. Note that, in practice, these values preferably correspond to those of the clearance referred to as the "passage clearance" JX which is observed when the head modules 13, 23 are in a configuration referred to as the "pre-positioning" configuration, close to the core location 60, while leaving space for the tool module 10 to pass, as will be described below, and as shown in FIGS. 5 and 6.

Likewise, the coupling device 29 preferably comprises at least a second carriage 40 which carries the second head module 23, and which is mounted movably and guided in translation along a second rail 41, preferably a pair of second rails 41. Said second rail 41, or each of said second rails 41, is preferably straight, and preferably horizontal, and is, like the first rail 31, mounted on the frame 32 and also embodies the coupling direction X.

Preferably, and as can be seen in particular in FIGS. 1, 2, 5, 6 and 20, the second rail 41 is aligned with the first rail 31, in the extension of said first rail 41, in a common direction which corresponds to the coupling direction X.

The propulsion of the second carriage 40 is preferably ensured by a second cylinder 43, advantageously distinct from the first cylinder 33, and potentially controllable independently.

Of course, the features relating to the movements FM_23, BM_23, the possible positions P23_1, P23_2, P23_3 and the useful travel length applicable to the second carriage 40 and to the second head module 23 may be deduced mutatis mutandis from the features described above with reference to the first carriage 30 and to the first head module 13, by symmetry about the engagement direction Z, and more particularly, where appropriate, by plane symmetry about the sagittal plane PS.

Note in this regard that, for convenience in the description, the observations concerning the geometric arrangement of the facility 1 have been made here with reference to the sagittal plane PS, in a facility 1 in which the tool module 10 is positioned, in the engagement configuration and in the closed configuration, vertically to the axis Y3 of the roller, preferably in a manner substantially centred on the sagittal plane PS containing the central axis Y3 of the roller, such that the engagement direction Z is concurrent with the central axis Y3 of the roller and such that the sagittal plane PS of the roller containing the central axis Y3 of the roller passes through, preferably in its middle, the location 60, referred to as the "core location 60", which is reserved for said tool module 10 between the first and second head modules 13, 23.

Of course, in the event of an arrangement in which the tool module 10, and more particularly the engagement direction Z, were off-centre with respect to the roller 3, and therefore in which the engagement direction Z, while remaining parallel to the sagittal plane PS containing the central axis Y3 of the roller, were offset (in the coupling direction X) with respect to said sagittal plane PS containing the central axis Y3 of the roller 3, in such a way for example that, in the closed configuration, the die 11 were positioned almost tangent to the roller 3, then the geometric observations in terms of layout, movements, and symmetries described above with respect to the sagittal plane PS could stand but reference would be made, instead of to the sagittal plane PS containing the central axis Y3 of the roller, to a gauge plane parallel to the sagittal plane of the roller 3 but offset accordingly in the coupling direction X, so as to pass through the middle of the virtual segment between the first and second connection faces 13A and 23A in the closed configuration, that is to say forming a "secondary" sagittal plane attached to the tool module 10 (and no longer to the roller 3), containing the engagement direction Z, and splitting the core location 60, and therefore said tool module 10, substantially into two equal halves.

According to a preferred possible embodiment, which is applicable regardless of the number of extruders 14, 24 carried respectively by the first head module 13 and where appropriate by the second head module 23, the coupling device 29 comprises, as can be seen in FIGS. 26A, 26B, 26C and 27, a locking mechanism 50 comprising a first jaw 51 and a second jaw 52 which are mounted movably in a third direction Y which is transverse, and preferably perpendicular, to the first engagement direction Z and transverse, and preferably perpendicular, to the second coupling direction X.

Said first jaw 51 and said second jaw 52 are arranged such that, when the tool module 10 is in the engagement configuration, they may move towards one another, on either side of the tool module 10, in said third direction Y, in such a way as to each come into engagement with the first head module 13 on the one hand and the second head module 23 on the other hand, in such a way as to force said first and second head modules 13, 23 to move towards one another and clamp, in the coupling direction X, against the tool module 10, in order to place the facility 1 in the closed configuration.

Each jaw 51, 52 is preferably self-propelled, in that on the one hand said jaw 51, 52 has on board at least one motor 53, preferably formed by a cylinder 53, and preferably a series of motors 53, preferably formed by cylinders 53, said motors 53 being preferably distributed in two rows, one row facing each head module 13, 23, and in that on the other hand each motor 53 acts on a tie rod 54, preferably oriented parallel to the third direction Y, said tie rod 54 being engaged in an anchor point 55, of notch type, provided on the corresponding head module 13, 23, in such a way as to be able to force the coming together in traction FM_51, FM_52 of the lock 51, 52 against the first and second head modules 13, 23. The tie rod 54 may advantageously be formed by the rod of the cylinder 53, for greater compactness.

The fact that there are multiple motors 53 advantageously makes it possible to exert a traction force of high intensity while keeping the motors 53 compact and relatively lightweight.

Moreover, the distribution of the motors 53 in rows, preferably aligned parallel to the engagement direction Z, as can be seen in FIGS. 26A, 26B and 26C, makes it possible to apply a traction force which is distributed, and preferably homogeneous, over the entire height of the jaws 51, 52, and consequently to obtain a clamping force F_X which is distributed, and preferably homogeneous, over the entire height of the receiving faces 10A, 10B of the tool module 10, and therefore substantially over the entire length of the channels 17 for conveying the extruded materials, and more particularly over the entire height of the junction planes between the plates constituting the tool module 10, which guarantees stable clamping, perfect sealing of the tool module 10 when the latter is formed of superposed plates, and perfect sealing of the joints between said tool module 10 and each of the first and second head modules 13, 23.

Figure 27:
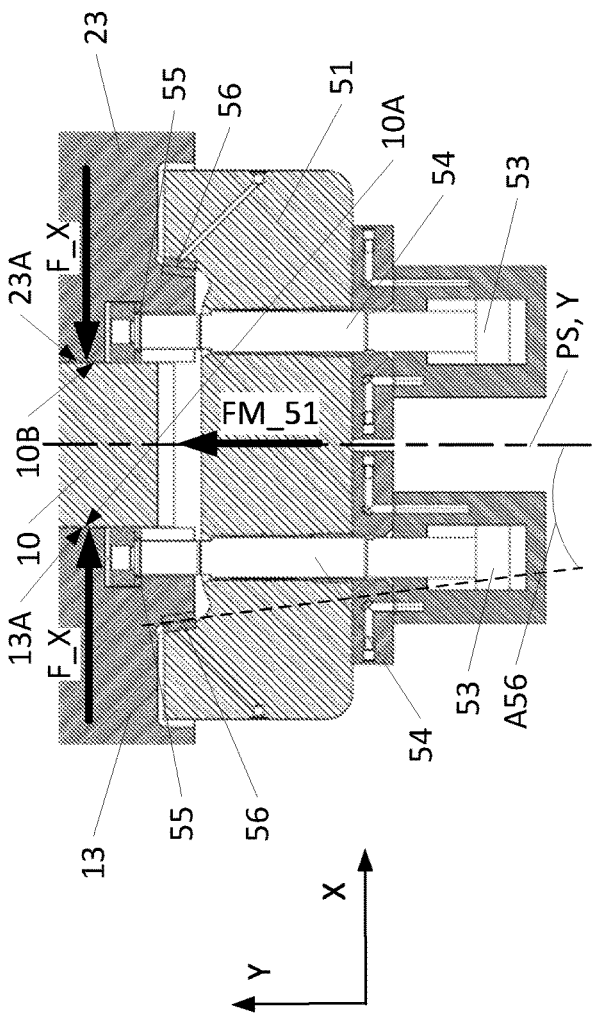
FIG. 27 shows, in a detail view from above in cross section through a plane, in this case a plane normal to the engagement direction Z and containing the coupling direction and the direction of movement of the jaws, referred to as the "locking direction", the engagement of ramps provided on the branches of the first jaw along corresponding counter-ramps provided in the first and second head modules, the inclination of said ramps and counter-ramps making it possible to convert a force bringing the jaws together, carried by the locking direction, into a clamping force carried by the coupling direction, transverse to the locking direction and making it possible to force said first and second head modules to move towards one another, in compression, against the tool block.

A system of ramps 56 having a non-zero angle of inclination A56 with respect to the third direction Y makes it possible to convert the traction force, generated by the motors 53 of the jaws 51, 52 and carried by the third direction Y, into the clamping force F_X carried by the first coupling direction X, which tends to bring the first head module 13 towards the second head module 23 and which thus makes it possible to clamp the tool module 10 by compression between said first and second head modules 23, as can be seen in FIG. 27.

Advantageously, said angle of inclination A56 of the ramps 56 makes it possible to obtain an amplifying effect, and thus to generate a clamping force F_X of greater intensity than the intensity of the traction forces developed by the motors 53 of the jaws 51, 52, something which once again favours the compactness of the facility 1.

According to a preferred application of the invention, the intensity of the clamping force F_X which is implemented in the coupling direction X is strictly greater, preferably at least three times greater, preferably at least five times greater, or even at least eight times greater, than the intensity of the preload force F_Z which is implemented to urge the tool module 10 against the first bearing 4 in the engagement direction Z. By way of illustration, the intensity of the clamping force F_X may in particular be 5 times to 10 times, and preferably 8 times to 8.5 times, greater than the intensity of the preload force F_Z.

Advantageously, such an intensity of the clamping force F_X allows the head modules 13, 23 to perform sufficient clamping of the tool module 10 such that, in the engagement direction Z, that is to say in this case according to a vertical component, the intensity (here vertical ascending) of the limit of friction without slipping which characterizes the resisting friction force that may be exerted on the receiving faces 10A, 10B of said tool module by the corresponding connection faces 13A, 23A of said first and second head modules 13, 23, which are pressed in contact with said receiving faces 10A, 10B, is strictly greater than the foreseeable maximum intensity of the vertical component (here vertical descending) of the resultant of the pressure of the extruded material on the tool module 10 in this same engagement direction Z.

In other words, the clamping force F_X is chosen to be sufficiently high that the transverse clamping of the tool module 10 by the first and second head modules 13, 23 allows said head modules 13, 23 to exert on said tool module 10, by friction, and therefore by passive reaction to the effects of the operating pressure prevailing in the air gap 12 during the production of a profiled element 2, which tends to push the die 11 away from the roller 3, a retaining force directed in the engagement direction Z, which is of opposite sign to the force resulting from the operating pressure exerted on the tool block 10, and which is sufficiently high to oppose and balance out, at any time, said force resulting from the operating pressure, and therefore to prevent the tool module 10 from slipping and moving back in the engagement direction Z under the effect of said operating pressure.

By way of illustration, the clamping force F_X applied will preferably be between 2,400 kN and 12,000 kN, i.e. approximately the equivalent of 240 tonnes to 1,200 tonnes.

Noted that, advantageously, and according to a preferred feature which may constitute an invention as such, the spatial arrangement of the facility 1 is ultimately optimized in terms of accessibility to the parts of the facility 1 and overall compactness of said facility, in that said arrangement exploits the six directions of three-dimensional space which are available all around the core location 60 of the facility 1, that is to say all around the location 60 occupied by the tool module 10 in the closed configuration, during the production of a profiled element 2. By convention, six directions X+, Y+, Z+, X−, Y−, Z− may in fact be defined on the basis of the three main directions X, Y, Z which each have their own orientation, and considering that each of said main directions X, Y, Z may be traversed either in a positive direction (+), or in a negative direction (−).

In this case, if the core location 60 is considered the origin of a frame of reference, the orthonormal basis of which is defined by the three main directions constituting the first engagement direction Z, the second coupling direction X, and the third locking direction Y, these main directions X, Y, Z intersecting in pairs, and more preferably being perpendicular in pairs in such a way as to form a rectangular trihedron, and if, purely for convenience in the description, said core location 60 equates to the volume in which the tool module 10 is inscribed in the closed configuration and which is virtually delimited by the six virtual faces of a rectangular parallelepiped, these virtual faces each being normal to one of the first, second and third main directions X, Y, Z, and thus corresponding in practice substantially or even exactly to the six outer faces of the tool module 10 when said tool module 10 is in said core location 60 in accordance with the engagement configuration or the closed configuration, then it may be seen that, preferably:

the roller 3 is arranged facing a first virtual face of the core location 60 which is normal to the first main direction Z, namely the engagement direction Z, and which in this case corresponds to the upper face of the tool module 10, such that said roller covers a direction Z+, while the lift 20 which makes it possible either to engage the tool module 10 in the core location 60, against the first bearing 4, or to remove the tool module 10 from the core location 60, is arranged and mounted movably in this same first main engagement direction Z, but facing a second virtual face of the core location 60 which is parallel to the first virtual face and opposite said first virtual face in the first main engagement direction Z, and which in this case corresponds to the lower face of the tool module 10, in other words said lift 20 covers the direction Z−, the first and second head modules 13, 23, and consequently the extruders 14, 24, preferably all the extruders of the facility 1, are arranged and mounted movably with respect to the core location 60 in the second main direction X, namely the coupling direction X, facing respectively, for the first head module 13, a third virtual face of the core location 60 which is normal to said second main coupling direction X and which corresponds to the first receiving face 10A of the tool module, in such a way as to cover the direction X− and, for the second head module 23, a fourth virtual face of the core location, which is parallel to the third virtual face and opposite said third virtual face in the second main coupling direction X, and which corresponds to the second receiving face 10B of the tool module, in such a way as to cover the direction X+, and the first and second jaws 51, 52 of the locking mechanism 50 are arranged and mounted movably with respect to the core location 60 in the third main direction Y, namely the locking direction Y, facing respectively, for the first jaw 51, a fifth virtual face of the core location 60 which is normal to said third main locking direction Y and which in this case corresponds to the first side face of the tool module 10, in such a way as to cover the direction Y− and, for the second jaw 52, a sixth virtual face of the core location which is parallel to the fifth virtual face and opposite said fifth virtual face in the third main locking direction Y, and which in this case corresponds to the second side face of the tool module 10, in such a way as to cover the direction Y+.

Thus, all the parts of the facility 1 are advantageously distributed homogeneously around the core location 60, and where appropriate mounted movably in directions X−, X+, Y−, Y+, Z−, Z+ distributed homogeneously around the core location 60, each of the six virtual faces delimiting said core location 60 being in fact occupied by and/or arranged to interact with one of said parts of the facility, namely respectively: the first head module 13, the second head module 23, the first locking jaw 51, the second locking jaw 52, the roller 3 (and its bearing or bearings 4, 5), and the lift 20 carrying the tool module 10.

According to a preferred feature which may constitute an invention in its own right, the engagement step (s1) comprises an approach phase (s1_1), during which the tool module 10 is moved in the engagement direction Z, in this case with the upward movement denoted MZ+, until said tool module 10 comes into contact with a docking stop 18 which is rigidly secured to the first bearing 4 and which makes it possible to stop the tool module 10 relative to the roller 3 at a distance adapted to the desired air gap 12, as shown in FIGS. 9 and 10, then a preloading phase (s1_2), during which the movement, in this case the upward movement MZ+, of the tool module 10 is continued in order to drive the first bearing 4 together with the tool module 10 in this same engagement direction Z, until said first bearing 4 comes into abutment against a first retaining member 61, against which the first bearing 4 is blocked and urged in the engagement direction Z by the preload force F_Z which is exerted by the tool module 10 against said first bearing 4 and the first retaining member 61, as shown in FIGS. 13 and 14.

Preferably, it is the lift 20 which executes the approach phase (s1_1), thus performing in practice the first and largest part of the total travel achieved by the tool module 10 during the overall engagement movement which ultimately brings said tool module 10 into the engagement configuration against the first bearing 4, while the preloading actuators 21, 22, separate from the lift 20, take over to execute the preloading phase (s1_2).

Said preloading actuators 21, 22 execute said preloading phase (s1_2) firstly by causing the tool module 10, and the first bearing 4, to perform the second, last and smallest part of the total engagement travel, that is to say the remaining travel which still separates the first bearing 4 from the first retaining member 61 at the moment when the tool module 10 comes into contact with the docking stop 18 of said first bearing 4, then subsequently by causing a rapid increase in the intensity of the compression of the tool module 10 against the docking stop 18 and therefore against the first bearing 4 as soon as said first bearing 4 is stopped by its coming into contact with the first retaining member 61.

To be specific, as soon as the first bearing 4, and therefore the tool module appended thereto via the docking stop 18, is blocked by the first retaining member 61 which opposes the continuation of the upward movement MZ+ of said first bearing 4 in the engagement direction Z, while moreover the preloading actuators 21, 22 continue to push the tool module 10 against said first bearing 4, and therefore, via said bearing 4, against the first retaining member 61, then an increase in the compression of the tool module 10 against the first bearing 4 is observed almost instantaneously, making it possible to quickly reach the desired intensity of the preload force F_Z.

Advantageously, such a differential approach makes it possible to combine precision, reproducibility, and robustness of the air gap.

To be specific, the height H12 of said air gap 12 is essentially determined by the position of the docking stop 18, which is fixed relative to the first bearing 4 and therefore relative to the central axis Y3 of the roller, and which therefore stops the relative movement of the tool module 10 with respect to said first bearing 4 and with respect to the central axis Y3 of the roller, and consequently stops the end face 11A of the die 11 carried by the tool module 10, at a desired radial distance from the central axis Y3 of the roller, and therefore at a desired radial distance from the receiving surface 3A of the roller (which is itself at a fixed radial distance from said central axis Y3).

In this regard, note however that the tool module 10 coming into contact with the docking stop 18 does not initially block the upward engagement movement MZ+ of the tool module 10 with respect to the frame 32, since the first bearing 4 itself has a certain degree of freedom in the engagement direction Z, with respect to the frame 32, such that the movable assembly formed at the end of the approach phase (s1_1), by bringing together the tool module 10, the first bearing 4 and the roller 3 carried by said first bearing 4, may continue the upward engagement movement MZ+, in the same subassembly, under the action of the preloading actuators 21, 22, until it is finally effectively stopped and immobilized with respect to the frame 32, subsequently, by the first retaining member 61 which blocks the progression of said movable assembly in the engagement direction Z, in the direction of the upward movement MZ+.

Advantageously, this two-phase engagement makes it possible notably to eliminate all the construction clearances which exist or could exist initially in the engagement direction Z, through the successive connections between the engagement device 19 (lift 20 and preloading actuators 21, 22), the tool module 10, and the first bearing 4 carrying the roller 3. Specifically, the facility 1 thus makes it possible to achieve, in the engagement direction Z, a tight stack, which is urged and therefore locked without any clearance, by the application of the preload force F_Z.

Note that the prestress exerted by the preload force F_Z not only makes it possible to eliminate any initial clearances, that is to say any empty spaces initially remaining between the various parts in question, but also to create a certain elastic deformation of the various parts thus placed under stress, preventing any relaxation of said parts, and therefore any subsequent reappearance of clearances. In particular, by virtue of the preloading, which will be chosen to be greater than the foreseeable stress which is generated, during production, by the operating pressure exerted by the material against the roller 3 from the tool module 10, it will be ensured that said stress generated by the pressure of the material during production will not cause elastic deformation, and therefore uncontrolled movement, of the retaining member 61 which retains the bearing 4 carrying the roller 3.

Preferably, the docking stop 18 may be adjustable, for example by means of a set of interchangeable wedges, such as spacers, such that the operator can choose, before engaging the closure of the facility 1, the distance from the axis of the roller Y3 at which said docking stop 18 must intercept and stop the tool module 10, and therefore such that the operator can choose and adjust, according to production requirements, the height H12 of the air gap 12.

Preferably, the second bearing 5 also comprises, in a similar manner, a docking stop 18.

Preferably, said docking stop 18 associated with the second bearing is located, in the engagement direction Z, at the same distance from the central axis Y3 of the roller, that is to say in this case more particularly at the same altitude, as the docking stop 18 associated with the first bearing 4.

In this way, the tool module 10 comes, preferably simultaneously, and more preferably at the same altitude in the engagement direction Z, into abutment against each of the two docking stops 18, which are rigidly secured, as regards the first, to the first bearing 4, and as regards the second, to the second bearing 5, and which are therefore distributed axially on either side of the roller 3, and more particularly on either side of the frontal plane PF, as can be seen in particular in FIGS. 3, 7, 10 and 14.

Thus, the first bearing 4 and the second bearing 5 are moved simultaneously in the engagement direction Z by the tool module 10, during the preloading phase (s1_2), in a well-balanced manner on either side of the frontal plane PF, which makes it possible to keep the orientation, and more particularly in this case the horizontal attitude, of the central axis Y3 of the roller constant during said preloading phase (s1_2).

The first retaining member 61 is preferably doubled, that is to say arranged in such a way as to be able to simultaneously intercept and block the first bearing 4 on the one hand, and the second bearing 5 on the other hand, on either side of the roller 3 and of the front plane PF.

To allow the generation of an effective preload force F_Z, which compresses against one another, in the following order, the tool module 10, the first and second bearings 4, 5 via their respective docking stops 18, and the first retaining member 61, the docking stops 18 are located, in the engagement direction Z, in this case vertical, at an intermediate distance (here an intermediate altitude) which is strictly between the central axis Y3 of the roller and the part of the tool module 10 furthest from said central axis Y3.

To give the first bearing 4 and the second bearing 5 the mobility necessary for the execution of the preloading phase (s1_2), said first and second bearings 4, 5 will preferably be provided with a first slide 62 and a second slide 63 respectively, each guided in translation in the engagement direction Z, on a first post 64 and a second post 65 respectively, both of which are rigidly secured to the frame 32, as can be seen in particular in FIGS. 1, 3, 10, 12 and 14.

Furthermore, note that, preferably, unlike the lift 20 which is guided on and by the frame 32, preferably via the posts 64, 65, the preloading actuators 21, 22 are carried respectively by the first and second head modules 13, 23, on which said preloading actuators 21, 22 bear in order to be able to generate the preload force F_Z. It is thus possible to generate a particularly high preload force F_Z by bearing solidly, in the engagement direction Z, in the region of the head modules 13, 23, and consequently by bearing, via the carriages 30 and 40 and the corresponding rails 31, 41, solidly on the frame 32 in the engagement direction Z, without it being necessary for the lift 20 itself to bear all this preload force F_Z.

According to one possible arrangement, the first and second preloading actuators 21, 22 may be formed by sliders, which are mounted movably and guided in translation in the coupling direction X, within the first head module 13 and the second head module 23, respectively.

Said preloading actuators 21, 22 may each be provided with a ramp 21A, 22A.

Said ramps 21A, 22A will preferably be inclined at an angle of between 10 degrees and 30 degrees with respect to the coupling direction X, and more generally with respect to the plane normal to the engagement direction Z, and thus in this case with respect to the horizontal plane, and/or, in an equivalent manner, inclined at an angle of between 60 degrees (=90−30) and 80 degrees (=90−10) with respect to the engagement direction Z.

In this way, the preloading actuators 21, 22 will form wedges which may alternatively either be retracted into a rest position (FIGS. 2, 6, 9) within their respective head module 13, 23, set back from the corresponding connection face 13A, 23A with respect to the core location 60, with respect to the tool module 10, and with respect to the sagittal plane PS, or conversely may be pushed out to project from the connection face 13A, 23A of their head module 13, 23 (FIG. 13), by a forward movement FM_21, FM_22 which is differential relative to the carriages 30, 40 carrying the head modules 13, 23, in such a way as to engage their ramp 21A, 22A against the tool module 10, and thus tend to force the tool module 10 to move towards, and then be compressed in preloading F_Z against the first bearing 4, and the first retaining member 61.

Said preloading actuators 21, 22 may be driven by any suitable drive means, such as a motor or cylinder, electric or hydraulic, preferably carried on board the head module 13, 23 in question.

Preferably, the first and second preloading actuators 21, 22 will act in opposition to one another, mirroring on either side of the tool module 10 and the sagittal plane PS containing the engagement direction Z, emerging respectively from the first head module 13 and from the second head module 23, in such a way as to exert a balanced action on the tool module 10, and thus maintain the attitude of said tool module 10 with respect to the engagement direction Z.

Furthermore, the differential translational movement of each of the preloading actuators 21, 22 in the coupling direction X, generated by the means for driving the preloading actuator in question, is a movement relative to its head module 13, 23, respectively, while said head module 13, 23 is held in position in said coupling direction X by a powerful cylinder 33, 43. It is therefore possible for the preloading actuators 21, 22 to exert against the tool module 10 a high penetration force in the coupling direction X, without causing the head modules 13, 23 to move back, which thus makes it possible to generate, via the conversion carried out by the ramps 21A, 22A, a very high preload force F_Z.

Preferably, the distance JZ referred to as the "preload clearance" JZ, which initially separates the first bearing 4 from the first retaining member 61 in the engagement direction Z, before the execution of the preloading phase (s1_2), as can be seen in FIGS. 5, 6, 8 and 11, and which therefore forms the distance which is travelled by the first bearing 4 in said engagement direction Z during said preloading phase (s1_2), is between 0.1 mm and 1 mm.

Advantageously, this slight preload clearance JZ offers the movable assembly formed by the tool module 10 and the first and second bearings 4, 5 a travel which is both long enough to allow the preloading actuators 21, 22 to properly execute their forward movement FM_21, FM_22 in the coupling direction X and to generate an overall upward movement MZ+ making it possible to eliminate any clearances present within the movable assembly, yet short enough to be quickly compensated for by the tool module 10 sliding on the gently sloping ramps 21A, 22A.

The preload clearance JZ advantageously becomes zero (JZ=0) when the first and the second bearings 4, 5, driven with and by the tool module 10 in an upward movement MZ+, meet the first retaining member 61, as shown in FIGS. 12 to 15, and generation of the desired preload force F_Z really begins, that is to say preloading and elastic deformation of the stack formed by the tool module 10, the bearings 4, 5 and the retaining member 61, under the thrust exerted by the preloading members 21, 22 in the engagement direction Z, and said preload clearance JZ remains at zero for as long as the preloading actuators 21, 22 act to press the tool module 10 and the bearings 4, 5 against the first retaining member 61, that is to say as long as the desired preload force F_Z is maintained, in particular during the extrusion operation (FIG. 21).

Preferably, the first retaining member 61 is rigidly secured to the first head module 13.

Thus, the head module 13 may serve as an anchor for the first retaining member 61, and retain said first retaining member 61 (at least) in the engagement direction Z, in order to prevent said retaining member 61 from moving in said engagement direction Z under the thrust of the preloading actuators 21, 22.

Furthermore, said first retaining member 61 is thus preferably mounted on the first carriage 30 which is used to move the first head module 13 in the coupling direction X, such that said first carriage 30 drives the first retaining member 61 together with the first head module 13 in the forward FM_13 and backward BM_13 movements of said first head module 13 in said coupling direction X.

More preferably, the first retaining member 61 occupies, on the first head module 13, a position which is fixed, at least in the engagement direction Z, more preferably which is fixed both in the engagement direction Z and in the coupling direction X, or even more preferably which is fixed in all three main directions X, Y, Z in space, with respect to the first connection face 13A of said first head module 13.

The operation of the first retaining member 61 during the sequence for closing the facility 1 will thus be particularly predictable, precise and reproducible.

Optionally, the first retaining member 61 may be formed in one piece with the portion of the first head module 13 which forms the first connection face 13A, in order to guarantee the rigidity and robustness of said retaining member 61.

Alternatively, the retaining member 61 may be formed by an added piece which is attached, for example screwed, to the first head module 13, in such a way as to be immobilized with respect to the first connection face 13A.

Advantageously, since the first retaining member 61 is itself retained by the first head module 13 against any movement in the engagement direction Z, in an unchanging position in the engagement direction Z with respect to the first carriage 30, and more particularly in an unchanging position with respect to the position occupied by the preloading actuators 21, 22 in said engagement direction Z, then the action of generating the preload force F_Z by the engagement of the preloading actuators 21, 22 against the tool module 10 therefore amounts to clamping, in the engagement direction Z, said tool module 10 and the first and second bearings 4, 5 in a vice grip between two jaws which are supported by the same head module 13, and more particularly by the same carriage 30, namely a first jaw, in this case constituting a jaw which is fixed in the engagement direction Z, and which is in this case formed by the first retaining member 61, and a second jaw, in this case constituting a movable jaw, formed by the ramp 21A, 22A of the preloading actuator 21, 22 which is located substantially plumb with the retaining member 61.

It will thus be possible temporarily, for the time required for closing and the extrusion operation, to rigidly secure the tool module 10 to the bearings 4, 5, by means of the first head module 13 (and more preferably by means of the first and second head modules 13, 23), at least in the engagement direction Z.

The first retaining member 61 may take any appropriate form, such as a shoulder, allowing it to be placed on the path taken by the first bearing 4 in the engagement direction Z during the engagement step (s1).

Preferably, said first retaining member 61 forms a hook, preferably C-shaped.

Preferably, the concave opening of said hook is directed towards the sagittal plane PS, to face the bearings 4, 5 in the coupling direction X.

Particularly preferably, the first retaining member 61 is arranged in such a way as to be placed on the path of the first bearing 4 (that is to say on the path taken by said bearing when it performs the upward movement MZ+) when the first head module 13 goes, in the coupling direction X, from its fully open position P13_1 (FIGS. 1 and 2) to its intermediate position P13_2 (FIGS. 5, 6 and 9), then remain on the path of the first bearing 4 when the first head module 13 goes from its intermediate position P13_2 to its contact position P13_3 (FIG. 16) and for as long as said first head module 13 remains in said contact position P13_3, in particular during the extrusion operation (FIG. 21).

Conversely, the first retaining member 61 is preferably arranged to disengage from the path of the first bearing 4 when the first head module 13 moves away from the sagittal plane PS so as to be set back from its intermediate position P13_2, in particular when the first head module 13 is in or returns to the fully open position P13_1 (FIGS. 1, 2, 23).

Thus, advantageously, the fact that the first retaining member 61 is carried by the first head module 13, and more particularly by the first carriage 30, makes it possible to simultaneously control the positioning of the retaining member 61 and the positioning of the first head module 13, as a function of the movements of the first head module 13 in the coupling direction X.

In this way, it is possible to position said retaining member 61 on the path of the first bearing 4 and, likewise, position said retaining member 61 on the path of the second bearing 5, in a blocking position for said bearings 4, 5, only when this is useful, and conversely to provide completely clear access to the bearings 4, 5 and roller 3 when the facility is in the open configuration.

Of course, in absolute terms, the first retaining member 61 could be carried by the second head module 23 rather than by the first head module 23.

However, preferably, the first retaining member 61 will be rigidly secured to the first head module 13, while the second head module 23 will itself have a second retaining member 66, rigidly secured to said second head module 23.

In a manner similar to what has been described for the first retaining member 61, the second retaining member 66 is secured to the second carriage 40, and more particularly is in a fixed position with respect to the second connection surface 23A of the second head module 23, at least in the engagement direction Z, preferably in both the engagement direction Z and the coupling direction X, or even in all three main directions X, Y, Z.

Likewise, the second retaining member 66 preferably takes the form of a C-shaped hook which engages the first bearing 4, and more particularly a double hook capable of engaging both the first bearing 4 and the second bearing 5, on either side of the frontal plane PF. As with the first retaining member 61, a preload clearance JZ will be provided and used between the second retaining member 66 and the corresponding bearing or bearings 4, 5, in a manner similar to what has been described above.

Thus, advantageously, the first retaining member 61 and the second retaining member 66 interact to retain the first bearing 4 each on one side of the sagittal plane PS containing the engagement direction Z, and the same applies to the second bearing 5. Such symmetrical retention of the bearings 4, 5, distributed and substantially balanced on either side of the sagittal plane PS, is particularly robust and stable.

More particularly, there is thus a retaining member 61, 62, and a corresponding bearing portion 4, 5, in each of the four quadrants delimited by the frontal plane PF and the sagittal plane PS, in projection on a base plane, in this case horizontal, normal to the engagement direction Z. This affords excellent seating of the bearings 4, 5 and the roller 3 against the tool module 10 (and vice versa).

Naturally, the retaining members 61, 66, and the head modules 13, 23, will be made of sufficiently rigid materials, for example metal alloy, and more preferably steel.

Preferably, the first bearing 4 comprises a base 67.

Said base 67 may preferably form two branches which extend substantially perpendicular to the engagement direction Z, each on a different side with respect to the sagittal plane PS.

When the first bearing 4 comprises a base 67, and the first head module 13 comprises a first retaining member 61, preferably in the form of a hook, while the second head module 23 comprises a second retaining member 66, preferably in the form of a hook, then said first and second retaining members 61, 66 are preferably arranged to take up a position opposite the base 67 of the first bearing 4 in order to retain and block said first bearing in the engagement direction Z, against the preload force F_Z exerted by the tool module 10 on said first bearing 4, as can be seen in particular in FIGS. 6 and 8.

Likewise, the second bearing 5 will preferably comprise a base 68.

Thus, preferably, the hooks forming the retaining members 61, 66 are disengaged from each bearing 4, 5 in question, and more particularly from the base 67, 68 of said bearing 4, 5, when the first and second head modules 13, 23 are moved away from the core location 60, into the fully open position P13_1, and close over said bases 67, 68 to trap them when said head modules 13, 23 move toward the core location 60 in the coupling direction X and reach their intermediate position P13_2.

The preload clearance JZ thus corresponds to the distance separating, in the engagement direction Z, and before the preloading actuators 21, 22 come into play, the branch (in this case the upper branch) of each hook forming the retaining member 61, 66 from the corresponding face (in this case the upper face) of the base 67, 68 trapped by said hooks.

Preferably, and in particular when the engagement direction Z is vertical, or substantially vertical, the preloading phase (s1_2) is carried out by raising the first bearing 4 by means of the tool module 10, and keeping the first bearing pressed against the first retaining member 61, in opposition to gravity.

Thus, during the preloading phase (s1_2), the first bearing 4 is raised by the 20 preloading actuators which lift said first bearing 4, and more particularly its base 67, off the support on which it rests in the open configuration, until said bearing 4, and more particularly the upper face of the base 67, comes into abutment against the first retaining member 61, and against the second retaining member 66, in this case against the respective lower faces of the upper branches of the hooks forming said first and second retaining members 61, 66.

Advantageously, such vertical operation makes it possible to take advantage of the inherent weight of the roller 3 and of the bearings 4, 5 so as to ensure stable seating of the movable assembly during the upward movement MZ+, which in particular prevents any tilting of the roller 3 or any jamming or jerking, and so as to facilitate the elimination of clearances between the tool module 10 and the bearings 4, 5, since the weight of the roller 3 and the bearings 4, 5 is distributed over the bases 67, 68, against the thrust exerted by the preloading actuators 21, 22 and transmitted through the tool module 10.

Naturally, the vertical thrust created by the preloading actuators 21, 22 must be sufficient not only to offset the combined weight of the roller 3, the bearings 4, 5 and the tool module 10, but also, additionally, to reach the preload force F_Z, which will in practice be much greater than the weight of the roller 3 and the bearings 4, 5 alone, which is exerted against the tool module 10. By way of illustration, the weight of the assembly made up of the roller 3 and the bearings 4, 5 may be of the order of 5 tonnes, whereas the preload F_Z envisaged may preferably be of the order of 60 tonnes.

Furthermore, such vertical operation simplifies the return, here the redescent, of the roller 3 and the bearings 4, 5, automatically under the simple effect of gravity, when the facility 1 returns to the open configuration. This passive return in particular makes it possible to save energy.

In this case too, the same also applies to the second bearing 5, which is preferably lifted up and pressed against the retaining members 61, 66, in opposition to gravity.

During the engagement step (s1), the preload force F_Z which urges the tool module 10 against the first bearing 4, in the engagement direction Z, is preferably generated by means of at least one preloading actuator 21, 22, as mentioned above, which at least one preloading actuator 21, 22 engages for this purpose against said tool module 10 in at least one region referred to as the "gripping region" 70 provided on said tool module 10.

Preferably, in particular for greater compactness and better robustness of the facility 1, said gripping region 70 is formed by the butt of the tool module 10, that is to say the face of the tool module 10, in this case the lower face, located at the opposite end to the roller 3 and the end face 11A of the die 11 in the engagement direction Z, and more particularly inclined portions of said butt, having shapes that match the ramps 21A, 22A of the preloading actuators 21, 22.

During the clamping step (s2), the first and second head modules 13, 23 come into abutment against the tool module 10, so as to exert the clamping force F_X, on portions of said tool module 10 referred to as "receiving faces" 10A, 10B, as described above.

According to a preferred feature of the invention which may constitute an invention in its own right, and as can be seen in FIG. 16, the portions of said tool module 10 referred to as "receiving faces" 10A, 10B on which the first and second head modules 13, 23 come into abutment are located in an intermediate region 71 which is between said at least one gripping region 70 and the roller 3, and are therefore closer to the air gap 12 than said at least one gripping region 70 urged by said at least one preloading actuator 21, 22.

Thus, the first and second head modules 13, 23 exert their clamping force F_X as close as possible to the air gap 12, which optimizes the stability and rigidity of holding of the tool module 10 in its engagement configuration, and more generally in the closed configuration, throughout the extrusion operation.

To be specific, such an arrangement shortens as far as possible the chain of transmission of the forces opposing the moving back of the tool module, or any other undesired movement of said tool module 10, under the effect of the pressure of the extruded material prevailing in the air gap 12.

Preferably, when said tool module 10 is in the core location 60, in contact with the docking stops 18 of the first and second bearings 5, more than 50% of the area of each receiving face 10A, 10B of the tool module 10, and more preferably the whole of said area of each receiving face 10A, 10B, is located in the intermediate region 71, that is to say closer to the air gap 12 and the roller 3, in the engagement direction Z, than the gripping region 70 furthest from the roller 3, or even where appropriate the gripping region 70 closest to the roller, out of the gripping region or regions 70 which interact with the preloading actuators 21, 22.

Thus, most or even all of the junction surfaces via which the head modules 13, 23 transmit the clamping force F_X to the tool module, in the coupling direction X, are closer to the roller 3 and the air gap 12, in the engagement direction Z, and therefore in this case at an altitude which is higher (but nevertheless lower than the altitude of the central axis Y3), than the gripping region 70, which is therefore further from the roller and the air gap than said junction surfaces, and hence in this case at an altitude lower than that of the receiving faces 10A, 10B and the corresponding connection faces 13A, 23A.

Note also that the respective connection faces 13A, 23A of the first and second head modules 13, 23, as well as, preferably, the corresponding receiving faces 10A, 10B of the tool module, preferably occupy an area in the engagement direction Z, in this case a range of altitudes, which is substantially or even exactly identical, such that, during clamping, the first and second connection faces 13A, 23A overlap in said engagement direction Z, and therefore stress the tool module 10 with a clamping force F_X which mainly, and preferably exclusively, constitutes a compressive stress.

This advantageously avoids generating on the tool module 10, when the clamping force F_X is applied, shear forces which would give rise to harmful shear stresses.

Likewise, the first and second head modules 13, 23 are preferably arranged to overlap in the third main direction Y, and more generally in such a way as to be superposed exactly in projection on a plane normal to their common coupling direction X, thus in this case for example in orthogonal projection on the sagittal plane PS, such that said first and second head modules 13, 23 stress the tool module 10 in compression, and not in shear, when they apply the clamping force F_X.

A preferred example of a closure sequence according to the invention will now be described, with reference to the facility 1 shown in the figures.

Initially, the facility 1 is in the open configuration, the first and second head modules 13, 23 being away from the core location 60 in the coupling direction X, in their fully open positions P13_1, P23_1 on either side of the sagittal plane PS, and the tool module 10 is in the disengagement configuration, outside the core location 60, at a distance from the roller 3 and the docking stops 18, as shown in FIGS. 1 and 2.

First of all, the coupling device 29 allows, preferably by means of a first carriage 30 guided by a first rail 31 in the coupling direction X and carrying the first head module 13 and a second carriage 40 guided by a second rail 41 in the coupling direction X and carrying the second head module 23, the first head module 13, carrying its first retaining member 61, and the second head module 23, carrying its second retaining member 66, to move towards one another into a configuration referred to as the "pre-positioning configuration", as shown in FIGS. 5 and 6.

To this end, the carriages 30, 40, and therefore the first and second head modules 13, 23 move towards the sagittal plane PS, substantially mirroring one another, through forward movements FM_13, FM_23 which converge towards the core location 60, until they reach their intermediate positions P13_2, P23_2 which correspond to said pre-positioning configuration, as shown in FIGS. 5 and 6.

In this pre-positioning configuration, said first and second head modules 13, 23 delimit between them a passage for the tool module 10.

Said passage is designed to allow the tool module 10 to reach the core location 60 and to come into contact with the bearings 4, 5 by passing between the first and second head modules 13, 23, and more particularly by passing between the connection faces 13A, 23A thereof. In this regard, and as can be seen in FIGS. 6 and 13, when they are in their intermediate position P13_2, P23_2, the first and second head modules 13, 23 provide a minimum distance in the coupling direction X, referred to as the "passage clearance" JX, between their connection faces 13A, 23A and the paths provided (in the engagement direction Z) for the corresponding receiving faces 10A, 10B of the tool module.

Geometrically, the passage clearance JX preferably corresponds to the distance, measured in the coupling direction X, which thus separates the connection face 13A, 23A belonging to a head module 13, 23 from the corresponding imaginary face of the core location 60 which is parallel to, and closest to, said connection face 13A, 23A.

Preferably, the passage clearance JX is between 0.5 mm and 50 mm.

Furthermore, in this pre-positioning configuration, the first and second retaining members 61, 66 take up a position opposite the base 67 of the first bearing 4 in the engagement direction Z, at a non-zero distance from said base 67 in said engagement direction Z, referred to as the "preload clearance" JZ, which preload clearance is preferably between 0.1 mm and 1 mm, as stated above. Thus, the first and second retaining members 61, 66 form obstacles on the path, in this case the upward path, of the first bearing 4 in the engagement direction Z.

Likewise, the first and second retaining members 61, 66 take up a position on the path intended to be taken by the base 68 of the second bearing 5 in the engagement direction Z.

In this case, more specifically, the upper branches of the hooks forming the retaining members 61, 66 are brought towards the sagittal plane PS, in the same forward movement FM_13, FM_23 as the head modules 13, 23, to which said retaining members 61, 66 are respectively rigidly secured, in such a way as to be placed above, that is to say vertically plumb with, the branches of each base 67, 68, so as to at least partially cover said bases 67, 68.

The engagement device 19 is for its part designed to then move the tool module 10 in the engagement direction Z, preferably by means of a lift 20, in this case with an upward vertical movement MZ+ in translation, through the passage delimited by the first and second head modules 13, 23, until said tool module 10 comes into contact with the docking stop 18 rigidly secured to the first bearing 4 (and, respectively, until the tool module simultaneously comes into contact with the docking stop 18 rigidly secured to the second bearing 5).

This approach phase (s1_1) is shown in particular in FIGS. 9 and 10.

The engagement device 19 is also designed to then continue the movement of said tool module 10, preferably by means of at least one preloading actuator 21, 22 having a ramp 21A, 22A which engages in abutment against the tool module 10 transversely to the engagement direction Z, by driving the first bearing 4 together with said tool module 10 in this same engagement direction Z until the base 67 of said first bearing 4 comes into abutment against the first and second retaining members 61, 66, thus eliminating the preload clearance (JZ=0) and thus placing the tool module 10 in the engagement configuration, subjected to the preload force F_Z, as shown in FIG. 13.

Note that the distance separating the preloading actuators 21, 22 from the retaining members 61, 66, in the engagement direction, is advantageously short, and in particular strictly less than the height of the posts 64, 65. In this way, the generation of the preload force F_Z will give rise to elastic deformation of the elements in question, and in particular a movement of the roller 3 under the effect of the preload, which is much less than what said deformation, and therefore the movement of the roller 3, would have been if the preload force loop had passed through the posts 64, 65, over the entire height of said posts. It is thus possible to apply, without interfering with the layout and therefore the functionality of the facility 1, a preload force F_Z of very high intensity, greater in terms of absolute value than the intensity of the force which will result from the pressure exerted in the air gap 12 by the extruded material.

During this preloading phase (s1_2), the guidance clearance JX, that is to say in this case the lateral clearance between the tool module 10 and the head modules 13, 23 remains, and the first and second connection faces 13A, 23A of the first and second head modules 13, 23 advantageously help guide the tool module 10 in translation in the engagement direction Z, between said head modules 13, 23, parallel to said connection faces 13A, 23A.

The coupling device 29 is also designed to be able to then bring the first and second head modules 13, 23 closer to one another in the coupling direction X, against the tool module 10, so as to place said first and second head modules 13, 23 in the closed configuration, as shown in FIG. 16.

During this clamping step (s2), the forward movements FM_13, FM_23 of the head modules 13, 23 are resumed and thus completed in the coupling direction X, towards the sagittal plane PS, in order to first of all eliminate the passage clearances (JX=0) so as to place the connection faces 13A, 23A of the head modules 13, 23 in contact with the receiving faces 10A, 10B of the tool module, that is to say place the head modules 13, 23 in their respective contact positions P13_3, P23_3, and then to generate, by compression of the head modules 13, 23 against the tool module 10, the desired clamping force F_X.

The tool module 10 is thus firmly locked in the core location 60, being prestressed in compression against the bearings 4, 5 by the preload force F_Z which is carried by the engagement direction Z and directed towards the central axis Y3 of the roller and towards the air gap 12. Advantageously, the application of the clamping force F_X carried by the transverse coupling direction X prevents the tool module from moving back spontaneously in the engagement direction Z, and therefore prevents said preload force F_Z from easing.

Advantageously, the locking of the tool module 10 by the head modules 13, 23 begins as close as possible to the air gap 12, almost at the altitude of said air gap, and is distributed at most over the height of the tool module 10, and therefore over a relatively short height. Thus, the force loop which connects the tool module 10 to the receiving surface 3A of the roller, passing through the head modules 13, 23, the retaining members 61, 66, then the bearings 4, 5 and the roller 3, and which closes through the air gap 8 separating the receiving surface 3A of the roller from the tool module 10, is particularly short. The air gap 12 is therefore particularly stable and has low sensitivity, in particular little deformability, vis-à-vis the stresses generated by the pressure of the extruded material or materials.

Preferably, the head modules 13, 23 are moved and clamped against one another by means of the first and second self-propelled jaws 51, 52, the tie rods 54 of which hook onto the anchor points 55 provided on the head modules 13, 23 in order to allow each of said jaws 51, 52 to exert traction, carried by the locking direction Y, simultaneously on a lateral flank of the first head module 13 and on a lateral flank of the second head module 23, in such a way as to force the jaws 51, 52 to move towards one another in the locking direction Y transverse to the coupling direction X, and consequently, by virtue of the ramps 56, to generate on the head modules 13, 23 a compressive force carried by the coupling direction X, as shown in FIGS. 26A, 26B and 26C.

More preferably, it is the carriages 30, 40 which first place the head modules 13, 23 in contact with the tool module 10, such that there is no longer any passage clearance JX, so that the jaws 51, 52 then only have to act on the head modules 13, 23 already placed in contact with the tool module 10 in order to generate the clamping stress F_X, by elastic compression of the head modules 13, 23 against the tool module 10.

Note that, when the first and second head modules 13, 23 go from their intermediate position P13_2, P23_2 to their contact position P13_3, P23_3, the retaining members 61, 66 belonging to the first head module 13 and the second head module 23 respectively advantageously move with said head modules 13, 23 in the coupling direction X while remaining in contact with the first bearing 4 and the second bearing 5 respectively, in this case by sliding on the upper face of the base 67, thus not causing any relaxation of the preload force F_Z.

To this end, the lower face of the upper branch of each hook forming the retaining member 61, 66 in question, and the upper face of the base 67 on which said hook engages, will preferably be parallel to the coupling direction X, and preferably flat and, in this case, horizontal.

Preferably, the steps in the closure sequence, specifically the succession of pre-positioning (s1), engagement (including the approach (s1_1) then preloading (s1_2) phases), then clamping (s2) steps, will be executed and sequenced automatically by means of a suitable control unit, preferably an electronic control unit.

Furthermore, the facility 1 preferably comprises at least one lateral stabilizing member 72, distinct from the first and second head modules 13, 23, for example a wedge 72 mounted movably in a third direction which is transverse to the first engagement direction Z and to the second coupling direction X, and which preferably corresponds here to the third main direction Y, parallel to the central axis Y3 of the roller.

Said lateral stabilizing member 72 is arranged so as to be, in the closed configuration, engaged by force between the base 67 of the first bearing 4 and at least one of the first and second head modules 13, 23, preferably in the cavity of at least one of the first and second retaining members 61, 66, as shown in FIGS. 17, 18 and 19, in such a way as to block and urge the first bearing 4 in the coupling direction X, transverse to the engagement direction Z, against the first and second head modules 13, 23 which also clamp the tool module 10.

Advantageously, such a lateral stabilizing member 72 will make it possible to reinforce the holding in position of the first bearing 4, and therefore of the central axis Y3 of the roller, relative to the frame 32, which holding in position is already for the most part, or even in practice entirely, ensured by the friction of the bearing 4 against the retaining member 61 under the effect of the preload force F_Z.

To be specific, the lateral stabilizing member 72 makes it possible to create—temporarily, for the duration of the closure and the extrusion operation—a fixed connection, with no risk of slipping in the coupling direction X, between the first bearing 4 and the frame 32, this connection passing through said lateral stabilizing member 72, then through the head module 13 in question and the corresponding carriage 30 before reaching the frame 32, via the rail 31 on the one hand and the cylinder 33 which fixes the position of the carriage 30 on said rail 31 on the other hand. The first bearing 4 is thus firmly immobilized, and even prestressed, in the coupling direction X.

Advantageously, the connection formed by the lateral stabilizing member 72 is moreover distinct from the connection formed by the first post 64 and the first slider 62, such that the lateral stabilizing member 72 provides support which is offset with respect to the first post 64 and the first slider 62, this offset support thus reinforcing the integrity of the assembly, and in particular preventing any bending of the first post 64, and any tilting in the frontal plane PF, which would tend to make said post 64 deviate from the engagement direction Z, by bending or leaning it towards the coupling direction X.

Preferably, the facility 1 will comprise at least one first lateral stabilizing member 72 intended to be inserted between the first retaining member 61 and the branch of the base of the first bearing 4 located on the same side as the first head module 13 with respect to the sagittal plane PS, and a second lateral stabilizing member 73 intended to be inserted between the second retaining member 66 and the other branch of the base 67 of the first bearing 4, located on the other side of the sagittal plane PS, that is to say on the same side as the second head module 23.

Naturally, a third lateral stabilizing member 74 and a fourth lateral stabilizing member 75 may likewise be provided in order to act on, and stabilize, the second bearing 5 vis-à-vis the first retaining member 61 and the second retaining member 66 respectively, as can be seen in FIGS. 18, 19 and 20.

The implementation of the lateral stabilizing member or members 72, 73, 74, 75 preferably constitutes the last step in the closure sequence.

Once said closure sequence has been completed, the tool module 10 is blocked and stressed with respect to the roller 3 in such a way as to form, from the extruders 14, 24 to the air gap 12, via the channels 17, a sealed extrusion circuit with perfectly controlled fixed dimensions.

The extrusion operation may then proceed, as shown in FIGS. 21 and 22.

The constituent material or materials of the profiled element, preferably rubber-based compounds, are thus kneaded and heated by the extruders 14, 24, and forced under pressure through the channels 17 as far as the die 11 and the air gap 12, which arrange them and shape them into a profiled element 2, which is conveyed by the rotation of the roller 3 as it is generated and comes out of the air gap 12.

Once the extrusion operation has been completed, and in particular if it is desired to replace the tool module 10 in place with another tool module, then the facility 1 is opened in accordance with the following opening sequence.

First, the carriages 30, 40 are brought back in the coupling direction X, with a backward movement BM_13, BM_23, in order to move the first and second head modules 13, 23 away from one another, preferably by making said head modules 13, 23 go from their contact position P13_3, P23_3 to their fully open position P13_1, P13_3, and thus disconnecting their connection faces 13A, 23A from the receiving faces 10A, 10B of the tool module 10 (FIG. 23). In doing so, the bases 67, 68 of the bearings 4, 5 are also released from the grip of the retaining members 61, 66. Preferably, this backward movement of the carriages 30, 40 is also used to disengage the preloading actuators 21, 22 from the tool module 10, and thus clear the path for the lift 20.

The tool module 10 is then removed from the roller 3 by making the lift 20 execute a moving-away movement MZ−, in this case a downward vertical movement MZ−, in the engagement direction Z (FIG. 24).

Lastly, the preloading actuators 21, 22 are withdrawn by retracting them into their respective head modules 13, 23 (FIG. 25), in this case with a differential backward movement BM_21, BM_22 carried by the coupling direction X.

Note in this regard that, as an alternative, the preloading actuators 21, 22 could be retracted into the head modules 13, 23 before loosening the grip of said head modules on the tool module 10, thus proceeding in exactly the reverse order of the preloading and clamping operations that were implemented during the closure sequence.

Therefore, since the manoeuvre for disengaging the preloading actuators 21, 22 offers little resistance, unlike the engagement manoeuvre which required significant force to make said preloading actuators 21, 22 penetrate under the tool module 10 in order to raise and urge said tool module 10 in the engagement direction Z, it is in this case possible to jointly disengage, with the same backward movement BM_13, BM_23, and therefore simultaneously, both the head modules 13, 23 and the preloading actuators 21, 22 so as to move them away from the tool module 10.

Naturally, the invention is in no way limited only to the alternatives described above, and a person skilled in the art could in particular isolate or freely combine the features described above, or replace them with equivalents.

The invention claimed is:

1. A method for implementing an extrusion facility intended for production of a profiled element, the extrusion facility comprising a roller which is supported rotatably by at least a first bearing, a tool module which comprises a die intended to interact with the roller so as to form an air gap allowing the profiled element to be shaped, and at least a first head module having a first extruder which is intended to supply the tool module with a first constituent material of the profiled element, the method comprising:
    an engagement step, during which the tool module is moved relative to the first head module and to the first bearing in an engagement direction, in such a way as to bring the tool module into abutment against the first bearing and to subject the tool module to a preload force which is oriented in the engagement direction and counter to the first bearing, in such a way as to place the tool module relative to the roller in an engagement configuration which defines a desired air gap for producing the profiled element; and
    then a clamping step, during which, while the tool module is in the engagement configuration, prestressed against the first bearing by the preload force, the tool module is clamped between the first head module having the first extruder and a second head module distinct from the first head module, by moving the first head module and the second head module toward one another, on either side of the tool module, in a coupling direction which is transverse to the engagement direction, in such a way as to place the first extruder in communication with the tool module, and by subjecting the first and second head modules to a clamping force which is oriented in the coupling direction, in such a way as to hold the tool module by compression between the first and second head modules.

2. The method according to claim 1, wherein the engagement step comprises an approach phase, during which the tool module is moved in the engagement direction, until the tool module comes into contact with a docking stop which is rigidly secured to the first bearing and which makes it possible to stop the tool module relative to the roller at a distance adapted to the desired air gap, then a preloading phase, during which the movement of the tool module is continued in order to drive the first bearing together with the tool module in the engagement direction, until the first bearing comes into abutment against a first retaining member, against which the first bearing is blocked and urged in the engagement direction by the preload force which is exerted by the tool module against the first bearing and the first retaining member.

3. The method according to claim 2, wherein a preload clearance distance, which initially separates the first bearing from the first retaining member in the engagement direction, before execution of the preloading phase, and which is travelled by the first bearing during the preloading phase, is between 0.1 mm and 1 mm.

4. The method according to claim 2, wherein the first retaining member is rigidly secured to the first head module.

5. The method according to claim 2, wherein the preloading phase is carried out by raising the first bearing by means of the tool module, and keeping the first bearing pressed against the first retaining member, in opposition to gravity.

6. The method according to claim 1, wherein, during the engagement step, the preload force which urges the tool module against the first bearing, in the engagement direction, is generated by means of at least one preloading actuator which engages for this purpose against the tool module in at least one gripping region provided on the tool module, and wherein, during the clamping step, the first and second head modules come into abutment against the tool module, so as to exert the clamping force, on receiving faces of the tool module which are located in an intermediate region which is between the at least one gripping region and the roller, and which are therefore closer to the air gap than the at least one gripping region urged by the at least one preloading actuator.

7. The method according to claim 1, wherein the preload force is between 300 kN and 1,500 kN.

8. The method according to claim 1, wherein an intensity of the clamping force which is implemented in the coupling direction is strictly greater than an intensity of the preload force which is implemented to urge the tool module against the first bearing in the engagement direction.

9. An extrusion facility intended for production of a profiled element, the facility comprising:
   a roller which is supported rotatably by at least a first bearing;
   a tool module which comprises a die intended to interact with the roller so as to form an air gap allowing the profiled element to be shaped;
   a first head module which carries at least a first extruder intended to supply a first constituent material of the profiled element;
   an engagement device, which makes it possible to move the tool module relative to the first bearing and relative to the first head module in an engagement direction, in such a way as to be able alternatively to either bring the tool module toward the roller until the tool module is in abutment against a docking stop which is rigidly secured to the first bearing, and subject the tool module to a preload force which is oriented in the engagement direction and counter to the docking stop and the first bearing, in such a way as to place the tool module relative to the roller in an engagement configuration which defines a desired air gap for producing the profiled element, or conversely move the tool module away from the roller and from the docking stop in order to place the tool module in a disengagement configuration, distinct from the engagement configuration;
   a second head module; and
   a coupling device which gives the first head module and/or the second head module its own mobility relative to the first bearing and relative to the tool module in a coupling direction which is oriented transversely to the engagement direction, so that the coupling device makes it possible alternatively either to bring the first head module and the second head module toward one another in the coupling direction, on either side of the tool module, when the tool module is in the engagement configuration, in such a way as to place the first extruder in communication with the tool module and to clamp the tool module between the first head module and the second head module, in a closed configuration, or conversely to move the first head module away from the second head module in the coupling direction, in such a way as to disengage the first extruder from the tool module and to release the tool module to allow a movement of the tool module relative to the bearing and relative to the first and second head modules in the engagement direction.

10. The facility according to claim 9, wherein the first bearing comprises a base, and
   wherein the first head module comprises a first retaining member, while the second head module comprises a second retaining member, the first and second retaining members being arranged to take up a position opposite the base of the first bearing in order to retain and block the first bearing in the engagement direction, against the preload force exerted by the tool module on the first bearing.

11. The facility according to claim 10, wherein the coupling device allows the first head module, carrying the first retaining member, and the second head module, carrying the second retaining member, to move toward one another into a pre-positioning configuration, in which the first and second head modules delimit between them a passage for the tool module,
   wherein the first and second retaining members take up a position opposite the base of the first bearing in the engagement direction, at a non-zero preload clearance distance from the base in the engagement direction,
   wherein the engagement device is designed to move the tool module in the engagement direction through the passage delimited by the first and second head modules, until the tool module comes into contact with the docking stop rigidly secured to the first bearing, then continue the movement of the tool module by driving the first bearing together with the tool module in the engagement direction until the base of the first bearing comes into abutment against the first and second retaining members, thus eliminating the preload clearance distance and thus placing the tool module in the engagement configuration, and
   wherein the coupling device is configured to be able to then bring the first and second head modules closer to one another in the coupling direction, against the tool module, so as to place the first and second head modules in the closed configuration.

12. The facility according to claim 10, further comprising at least one lateral stabilizing member, distinct from the first and second head modules, the lateral stabilizing member being arranged so as to be, in the closed configuration, engaged by force between the base of the first bearing and at least one of the first and second head modules, in such a way as to block and urge the first bearing in the coupling direction, transverse to the engagement direction, against the first and second head modules which clamp the tool module.

13. The facility according to claim 9, wherein the tool module is delimited, in the coupling direction, by a first receiving face against which the first head module is intended to come into abutment in the closed configuration so as to place the first extruder in communication with the tool module and apply a clamping force, and by a second receiving face against which the second head module is intended to come into abutment in the closed configuration so as to apply the clamping force,
- wherein the first and second receiving faces are flat and each has an orientation, with respect to the engagement direction, which is such that an angle of inclination between the receiving face concerned and the engagement direction is less than 10 degrees, such that the first and second receiving faces are substantially parallel to one another and substantially parallel to the engagement direction, and
- wherein the coupling direction forms an angle of between 70 degrees and 110 degrees, with respect to the engagement direction.

14. The facility according to claim 9, wherein the first extruder comprises at least one screw rotated about a longitudinal axis in a sleeve, and wherein the longitudinal axis is parallel to the coupling direction to within +/−10 degrees.

15. The facility according to claim 9, wherein the coupling device comprises a locking mechanism comprising a first jaw and a second jaw which are mounted movably in a third direction which is transverse to the engagement direction and transverse to the coupling direction, and which are arranged such that, when the tool module is in the engagement configuration, the first jaw and the second jaw may move toward one another, on either side of the tool module, in the third direction, in such a way as to each come into engagement with the first head module and the second head module, in such a way as to force the first and second head modules to move toward one another and clamp, in the coupling direction, against the tool module, in order to place the facility in the closed configuration.

* * * * *